United States Patent [19]

Ohta et al.

[11] Patent Number: 5,101,288
[45] Date of Patent: Mar. 31, 1992

[54] LCD HAVING OBLIQUELY SPLIT OR INTERDIGITATED PIXELS CONNECTED TO MIM ELEMENTS HAVING A DIAMOND-LIKE INSULATOR

[75] Inventors: Eiichi Ohta, Yokohama; Hitoshi Kondo, Machida; Yuji Kimura, Yokohama, all of Japan

[73] Assignee: Ricoh Company, Ltd., Tokyo, Japan

[21] Appl. No.: 505,222

[22] Filed: Apr. 5, 1990

[30] Foreign Application Priority Data

Apr. 6, 1989 [JP] Japan .................. 1-87352
Apr. 12, 1989 [JP] Japan .................. 1-92104
Apr. 12, 1989 [JP] Japan .................. 1-92105

[51] Int. Cl.⁵ .................. G02F 1/133; B01J 3/06; B01J 3/08
[52] U.S. Cl. .................. 359/54; 359/58; 359/79; 340/784; 423/446; 156/DIG. 68
[58] Field of Search .............. 350/333, 332 R, 331 R, 350/335, 336, 334; 357/58; 340/784; 428/408; 156/DIG. 68; 423/446

[56] References Cited

U.S. PATENT DOCUMENTS

| | | | |
|---|---|---|---|
| 4,368,523 | 11/1983 | Kawate | 350/334 X |
| 4,413,883 | 11/1983 | Baraff | 350/334 |
| 4,523,811 | 6/1985 | Ota | 350/333 |
| 4,600,274 | 7/1986 | Morozumi | 350/339 F |
| 4,653,862 | 3/1987 | Morozumi | 350/339 F |
| 4,716,403 | 12/1987 | Morozumi | 350/339 F X |
| 4,775,861 | 10/1988 | Saito | 350/333 X |
| 4,851,827 | 7/1989 | Nicholas | 350/333 X |
| 4,892,389 | 1/1990 | Kuijk | 350/333 |
| 4,930,874 | 6/1990 | Mitsumune et al. | 350/333 |
| 4,932,331 | 6/1990 | Kurihara et al. | 423/446 X |

FOREIGN PATENT DOCUMENTS 62-91081 12/1987 Japan .
64-40929 2/1989 Japan .
64-55540 3/1989 Japan .

OTHER PUBLICATIONS

Yoder, Max N., Extended Abstracts: Technology Update on Diamond Films, 4/25/89, pp. 35-38.
Han, He-Xiang et al., Extended Abstracts: Diamond and Diamond-Like Materials Synthesis, pp. 23-26.

*Primary Examiner*—Stanley D. Miller
*Assistant Examiner*—Ron Trice
*Attorney, Agent, or Firm*—Oblon, Spivak, McClelland, Maier & Neustadt

[57] ABSTRACT

A liquid crystal display device that includes a pair of transparent substrates between which a liquid crystal layer is disposed. A common electrode is formed on an inside of at least one of the substrates. A plurality of pixel electrodes are formed on an inside of at least one of the substrates. At least one MIM layered structure is connected to each of the pixel electrodes. A hard carbon film constitutes an insulator layer of the MIM structure.

11 Claims, 14 Drawing Sheets

CHANGE WITH TIME IN HIGH TEMP.

CHANGE WITH TIME IN LOW TEMP.

LCD HAVING OBLIQUELY SPLIT OR INTERDIGITATED PIXELS CONNECTED TO MIM ELEMENTS HAVING A DIAMOND-LIKE INSULATOR

BACKGROUND OF THE INVENTION

1. Field of the Invention

The present invention relates to an active matrix type liquid crystal display device which uses an MIM (metal-insulator-metal) device as a nonlinear resistance thereof and which display device is applicable to high capacity flat panel display devices for OA (office automation) and TV, etc.

Also, the present invention relates to a matrix display device, especially to an active matrix display device which is applicable to flat panel display devices such as a liquid crystal display device, etc.

2. Description of the Related Art

An active matrix type liquid crystal display device in gereral comprises a pair of insulator substrates between which a liquid crystal layer is constituted wherein a nonlinear resistance device is connected in series to each of pixels of at least one of the substrates. Such a nonlinear resistance device usually comprises an MIM device.

An MIM device comprises an insulator substrate made from glass or the like, a lower electrode made from a metal such as Ta, Al, Ti etc., an insluation film comprising a transparent electrode made from the metal oxide of lower electrode metal or $SiO_x$, $SiN_x$ etc., and an upper electrode made from a metal such as Al, Cr etc. disposed in this order on the substrate.

An example of the MIM device in which a metal oxide is used as the insulation film is disclosed in Japanese Patent Application Laying Open (KOKAI) Nos. 57-196589, 61-232689 and 62-52333. The metal oxide of this MIM device is formed by anodic oxidizing or thermal oxidizing of the lower electrode, which makes the producing process of the device very complicated. Besides, the process requires a thermal treatment at a high temperature (the anodic oxidizing process also requires the thermal treatment for removing impurities.). Further, in accordance with the process, it is not easy to accurately control the film quality and the film thickness so that uniform products are not always obtained. Further, the substrate has to be made from a heat-resistant material and the insulation film has to be made from a metal oxide having a stable characteristic, which limits the materials to be selected and the characteristic of the device can not be easily changed and as a result the freedom of design is narrowed. This means that it is difficult to realize a liquid crystal display device utilizing the MIM device in which the display device fully satisfies the requirements from the user. Also, due to the low controllability of the film of the MIM device mentioned above, the device characteristics of current (I) and voltage (V), especially symmetry of the I-V characteristic is impaired so that the ratio ($I_-/I_{30}$) of the minus biassed current $I_-$ with respect to the plus biassed current $I_+$ becomes unstable. Also, when the MIM device is used as an element of the liquid crystal display (LCD), it is necessary that the ratio of the liquid crystal capacity ($C_{LCD}$) with respect to the MIM capacity ($C_{MIM}$) is more than 10. Therefore, the MIM capacity is desirably small. However, the metal oxide film has a large dielectric constant, which makes the element capacity large. Therefore, it becomes necessary to process the device to form a structure having a small surface area so as to reduce the device capacity. Also, in this case, at the time of the rubbing process for sealing the liquid crystal in the device, the insulation film is sometimes mechanically damaged, which reduces the throughput of the device.

Besides, with respect to the large capacity device having a large display area, there are problems of short circuit between the devices, snapping of wires and misorientation of the liquid crystal due to dust and defective pixels or electrodes, which degrade the display quality of the device.

In order to obviate the above mentioned problems, Japanese Patent Application Laying Open (KOKAI) No. 62-59927 discloses a display device in which an image to be displayed is divided into at least two parts each of which is connected to a switching means composed of an MIM device. However, by dividing the image, the capacity ratio mentioned above may become undesirable. Therefore, it is desirable, from the aspect of this point too, that the MIM capacity be small as possible.

On the other hand, with respect to the MIM device comprising the insulation film of $SiO_x$ or $SiN_x$ as disclosed in Japanese Patent Application Laying Open (KOKAI) No. 61-275819, the insulation film is formed by a gas or vapor phase process such as a plasma CVD method or a sputtering method which is conducted at a temperature more than 300° C., which requires a heat resistant substrate which is expensive. Also, it is not easy to obtain a film of even thickness and uniform quality owing to the temperature distribution over the large area of the display substrate. Also, the insulation film is made from an amorphous substance which is easy to change the characteristic thereof, which causes problems of optical degradation of the device and change of the photoelectricity (resistance change according to the luminous intensity). Therefore, also in this case, the design freedom of the device is narrowed. Also, dust particles are generated in the gas phase at the time of film forming process, which causes pin holes of the film and also reduces the throughput of the device.

Also, the insulation film used in the known MIM device is not fully sufficient with regard to the dielectric breakdown voltage and the threshold voltage.

Also, the present inventors have proposed an MIM device comprising an insulation film made from a hard carbon film (i-type carbon) which is very thin (about 20 to 100 Å). The conductive system using this thin film is based on the tunnel conductivity of the film. Such a thin film is suitable for use as a superthin film element such as a high speed switching element and a tunnel light emission element. However, when the film is applied to the liquid crystal display device, it is desirable that the film be thick from the standpoint of dielectric breakdown voltage, throughput (productivity), uniformity of the element characteristic and/or threshold voltage.

Considering the above-mentioned points, it is proposed to connect two MIM devices in series for one pixel in Japanese Patent Application Laying Open (KOKAI) Nos. 61-284728 and 62-69239. However, the insulation film of the MIM device is formed on the temperature condition of 200° to 300° C. or more, which limits the substrate material. Therefore, the dielectric constant of the substrate has to be large, which impedes making the MIM device surface sufficiently small.

An active matrix display device comprises a metal-insulator-metal device (MIM device). A typical MIM device comprises, as disclosed in Japanese Patent Application Laying Open (KOKAI) No. 62-62333, a lower electrode made from Ta, an insulation film made from $Ta_2O_5$ (anodic oxidized film) and an upper electrode made from Cr or Cr/ITO. Heat treatment of about 300° to 500° C. is conducted to obtain a symmetric polarity of the device.

Also, another example of the MIM device is disclosed in Japanese Patent Application Laying Open (KOKAI) No. 61-260219 in which the lower electrode is made from ITO and the insulation film is made from $SiN_x$ which is formed by a plasma CVD method and the upper electrode is made from Cr.

Also, Japanese Patent Application Laying Open (KOKAI) No. 63-187279 discloses a matrix display device in which the above-mentioned MIM devices are used in such a way that each pixel is connected to two scanning lines through two MIM devices.

However, the matrix display device comprising the known MIM devices disclosed in the publications has problems of wire snapping and short circuit, which impairs the display quality of the device, since the MIM device of the publications has problems as mentioned below.

First, when the insulation film of the MIM device is formed by anodic oxidizing, it is not possible to desirably control or change the characteristic of the MIM device since the insulation film material is limited to the metal oxide formed by anodic oxidizing of the lower electrode metal.

Second, the substrate material is limited to a heat resistant material since the device has to be treated at a temperature of 300° to 500° C.

Third, the ratio of MIM capacity with respect to the liquid crystal capacity has to be smaller than 1/10. Therefore, when the device is used as a switching element of the liquid crystal device, it becomes necessary to make the device surface small since the dielectric constant of the substrate is high, which requires a fine processing of high accuracy.

Also, with regard to the MIM device comprising the insulation film of $SiN_x$, the film is formed at a high temperature of about 300° C., which limits the material of the substrate, as in the case of above-mentioned MIM device. Besides, pin holes are eaasy to be formed in the device due to dust particles, which reduces the throughput of the products.

SUMMARY OF THE INVENTION

It is therefore an object of the present invention to provide a liquid crystal display device comprising an MIM device which comprises an insulation film made from hard carbon and in which the pixel electrode is divided so that a mechanically strong insulation film having a high controllability of the film and low dielectric constant can be formed easily at a low temperature (room temperature), which makes it possible to widen the design freedom of the device and realize a display device of stable and uniform characteristic in the aspect of threshold voltage and dielectric breakdown strength so that the defective pixels are minimized and the throughput of the device is heightened at a low cost.

Another object of the present invention is to provide a liquid crystal display device comprising MIM devices used as a switching element of high reliability in which the insulation film is made from hard carbon and a plurality of MIM devices are connected to one pixel so that the design freedom of the device is widened and the mechanical strength is heightened and that any desirable material can be selected as the substrate, which makes it possible to realize a fully satisfactory display device having a large display area.

It is a further object of the present invention to provide a matrix display device in which the above-mentioned drawbacks of the related art can be obviated so that the problems of wire snapping and short circuit are attenuated.

The above-mentioned objects of the invention can be achieved by a liquid crystal display device comprising: a pair of electric insulator substrates, each substrate comprising a plurality of pixels; a liquid crystal layer disposed between the pair of substrates; nonlinear resistance elements each being connected in series to each of the pixels and composed of an MIM device which is made from a hard carbon film disposed between a first conductor as a bus line and a second conductor as a pixel electrode, wherein the pixel electrode is divided into at least two parts each being connected to the MIM device.

Advantages of the above-mentioned liquid crystal display device in accordance with the present invention are as follows.

First, the design freedom of the device becomes large since the insulation film of the MIM device is formed by a gas or vapor phase process such as a plasma CVD method in which the characteristic of the film can be widely controlled by changing the film forming condition.

Second, a hard and thick film can be realized so that the mechanical damage is minimized and the pin holes in the film are decreased.

Third, a high quality film can be formed even at a low temperature around the room temperature so that the substrate is not limited to a heat resistant material and that the large size display can be effectively formed.

Fourth, a film of even thickness and uniform quality can be formed, which is suitable for using as an element of thin film devices.

Fifth, since the dielectric constant is low, it becomes unnecessary to treat the substrate by a fine processing of high accuracy and becomes possible to heighten the rising up characteristic of the MIM, which makes it possible to effectively constitute a large panel of the display.

Sixth, throughput of the productivity is improved since the defective pixels are attenuated, which reduces the cost of the liquid crystal display devices.

Also, the above-mentioned objects of the present invention can be achieved by a liquid crystal display device comprising: a pair of transparent substrates; a liquid crystal layer disposed between the substrates; a common electrode formed on an inside surface of at least one of the substrates; a plurality of pixel electrodes connected to the common electrode through MIM elements, wherein a plurality of MIM devices are connected in series to one pixel and the insulation layer is made from a hard carbon film.

In accordance with the above-mentioned liquid crystal display device of the present invention, the insulation layer of the MIM device is made from a hard carbon film and a plurality of MIM devices are connected in series to one pixel. Therefore, it is an advantage of the present invention that the element surface of each MIM is increased, thus heightening the accuracy of the processing of the device, which makes it possible to produce uniform MIMs so that the display quality is upgraded. Also, since a plurality of MIMs are connected to one pixel, if one of the MIMs should be damaged and not show the nonlinearity caused by short circuit or the like, the display function can be followed by the remaining MIMs so that defective pixels are minimized even if the luminous contrast is lowered, and the reliability of the display of high quality and high density is increased.

Also, the object of the present invention mentioned before can be achieved by a matrix display device comprising a pair of substrates and a plurality of pixel electrodes formed on at least one of the substrates, wherein each pixel electrode is connected to two scanning electrodes disposed adjacent to the pixel electrodes through an MIM device and wherein the MIM device is composed of a first conductor, a second conductor and a hard carbon film disposed between the first and second conductors.

Due to the advantages mentioned above, the MIM device of the present invention is especially suitable for using as a reliable switching device of a liquid crystal display device.

Further, in accordance with the matrix display device of the present invention, each pixel electrode is connected to two scanning electrodes through two MIM devices, which makes it possible to avoid the problems of wire snapping of the elements and the scanning electrodes. Also, the defective pixel caused by short circuit of the devices can be corrected to form a normal pixel, which increases the throughput of the device production.

Further objects and advantages of the present invention will be apparent from the following description of the preferred embodiments of the invention as illustrated in the accompanying drawings.

DESCRIPTION OF THE PREFERRED EMBODIMENTS

Figure 1:
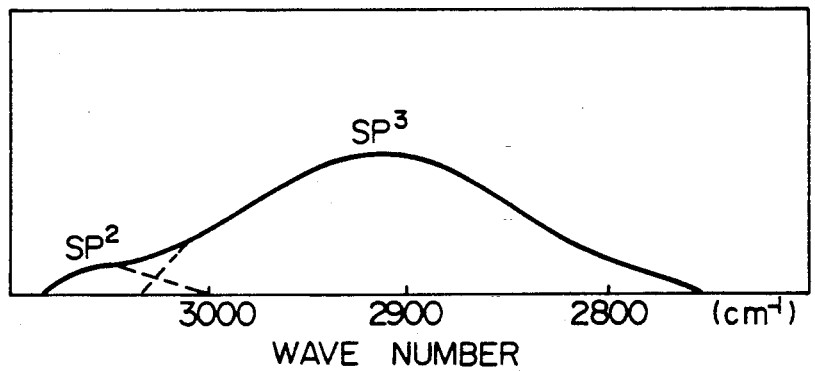
FIG. 1 is a graphical view of IR spectrum of the hard carbon insulation film used in the MIM device in accordance with the present invention.

A primary feature of the liquid crystal display device in accordance with the present invention is that the nonlinear resistance device of the display device comprises an MIM device which has an insulation film made from a hard carbon film.

The insulator film used in the MIM device is made from the hard carbon film which is constituted from material containing at least one of amorphous and microcrystalline material comprising carbon atoms and hydrogen atoms as the main constituent elements. The hard carbon film is also referred to as an i—C film, a diamond-like carbon film, an amorphous diamond film or a diamond thin film.

One of the features of the hard carbon film is that the film is deposited in gas phase so that the various characteristics thereof can be widely controlled in response to the conditions under which the film is deposited. Therefore, the hard carbon film can cover the resistivity range from semiinsulator region to insulation region so that the film can be used not only as an insulator but also as a semiinsulator. Therefore, the MIM device of the present invention may also be referred to as MSI (Metal-Semi-Insulator).

For depositing the hard carbon film, an organic compound gas, especially a hydrocarbon gas is used. It is to be noted that the phase of the material does not necessarily have to be gas at a normal temperature and normal pressure. A liquid or solid phase material can be used by gasifying the material through a melting process, a vaporizing process or a sublimation process at a high temperature or in a reduced pressure.

For the hydrocarbon gas as the starting gas material, all of hydrocarbons may be used such as paraffin hydrocarbons, for example, $CH_4$, $C_2H_6$, $C_3H_8$, and $C_2H_{10}$; acetylene hydrocarbons such as $C_2H_4$; olefin hydrocarbons; diolefin hydrocarbons; and aromatic hydrocarbons.

Further, other than the above-mentioned hydrocarbons, those compounds containing carbon element such as alcohols, ketons, ethers, esters, CO and $CO_2$ may also be used as the starting gas material.

It is preferable to form the hard carbon film from the starting gas material in such a way that the active species for forming the film is formed through a plasma state generated by a plasma method with the use of direct current, low frequency wave, high frequency wave or microwave, etc. It is further preferable to utilize a magnetic field effect since the film is deposited at a low pressure for the purpose of forming a large sized uniform film at a low temperature.

Also, the active species may be formed by a pyrolytic process. Furthermore, the active species may be formed through an ionized state generated by an ionizing vapor deposition process or an ion beam vapor deposition process. Or otherwise, the active species may be formed from the neutral species formed by a vacuum vapor deposition process or a sputtering process. Furthermore, the species may be formed by a combination of the above-mentioned processes.

An example of the deposition condition for forming the hard carbon film by plasma CVD method is as follows.

RF power: 0.1 to 50 W/cm$^2$.
Pressure: $10^{-3}$ to 10 Torr.
Temperature: room temp. to 950° C. preferably room temp. to 300° C.

In the above-mentioned plasma state, the starting gas is decomposed to radicals and ions which react so that a hard carbon film is deposited on the substrate which film comprises an amorphous material and/or a microcrystalline material having crystal of several tens Å to several μm composed of carbon atoms C and hydrogen atoms H.

Characteristics of the hard carbon film are represented in the following table-1.

TABLE 1

| | |
|---|---|
| Specific resistivity (ρ) | $10^6$ to $10^{13}$ Ωcm |
| Optical band gap (Egopt) | 1.6 to 3.0 eV |
| Hydrogen in film ($C_H$) | 10 to 50 atm % |
| SP$^3$/SP$^2$ | 2/1 to 4/1 |
| Vickers hardness (H) | 2500–9500 kg·mm$^{-2}$ |
| Refractive index (n) | 1.9 to 2.4 |
| Defect density | $10^{17}$ to $10^{19}$ cm$^{-3}$ |

(Note) Measuring methods are as follows.

Specific resistivity (ρ): Obtained from I-V characteristic determined by using coplanar-type cell.

Optical band gap (Egopt): Determined from equation $$(\alpha h\nu)^{\frac{1}{2}} = \beta(h\nu - Egopt)$$

wherein absorption coefficient (α) is obtained from the spectral characteristic.

Hydrogen amount in film ($C_H$): Calculated from equation $$C_H = A \int \alpha(W)/W \cdot dW$$

wherein "A" is the absorptive section area. Peaks around 2900 cm$^{-1}$ of infrared absorption spectrum are integrated.

SP$^3$/SP$^2$: Infrared absorption spectrum is analyzed to Gauss curves corresponding to SP$^3$ and SP$^2$, respectively. The ratio SP$^3$/SP$^2$ is obtained from area ratio of the curves.

Vickers hardness (H): Measured by microvickers test device.

Refractive index (n): Measured by ellipsometer.

Defect density: Measured by ESR.

Figure 2:
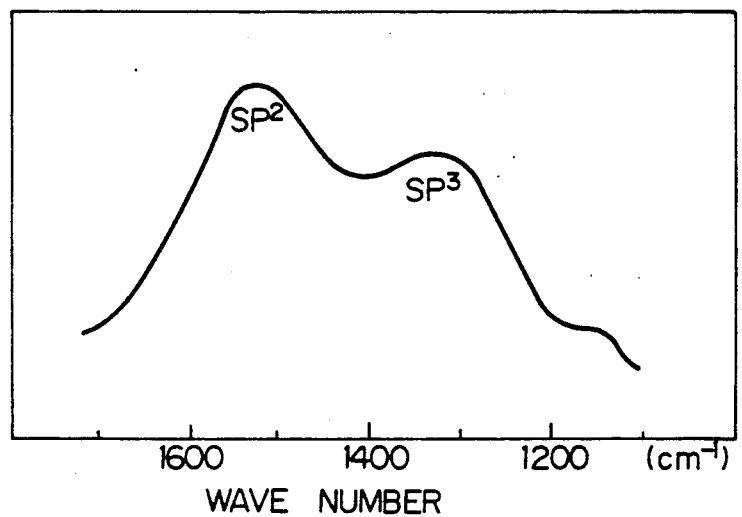
FIG. 2 is a graphical view of Raman spectrum of the hard carbon insulation film used in the MIM device in accordance with the present invention.

A result of the analysis of the hard carbon film by the IR absorption method and the Raman spectroscopy method is graphically represented in FIGS. 1 and 2. As can be seen from the graphs, the atomic structure of the film includes the atomic bond wherein carbon atoms form hybridized orbitals of SP$^3$ and SP$^2$.

Figure 3:
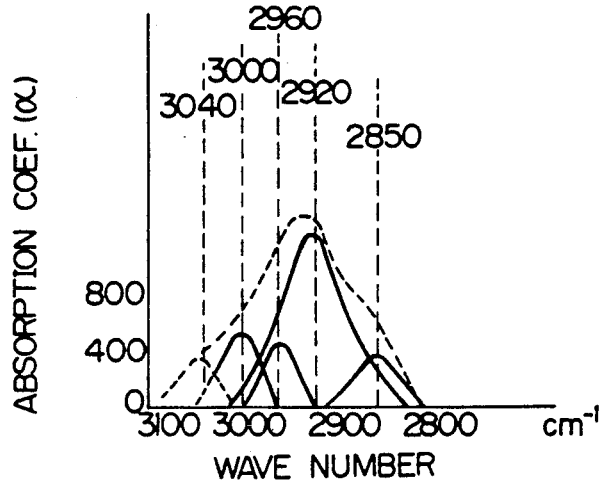
FIG. 3 is a graphical view of the Gaussian distribution of the hard carbon insulation film used in the MIM device in accordance with the present invention.

The ratio of SP$^3$ bond and SP$^2$ bond can be estimated from the analysis of the IR (infrared) spectrum to separate the peaks thereof. The measured IR spectrum comprises a plurality of spectral modes around 2800 to 3150 cm$^{-1}$. The correspondence between the peak of each mode and the wave number thereof is known so that the peaks can be separated on the basis of Gaussian distribution, as illustrated in FIG. 3, and that the respective peak areas are calculated so as to determine the ratio SP$^3$/SP$^2$ from the ratio of the peak areas.

Also, it is confirmed by an X-ray analysis and an electron diffraction analysis that the film is in an amorphous state (a-C:H) and/or a microcrystalline state containing minute crystal grains of about 50 Å to several μm.

In accordance with the plasma CVD process which is suitable for mass production, the specific resistivity and the hardness of the film are increased according as the RF power becomes small. Also, the life of the active species is elongated according as the pressure becomes low. Therefore, it becomes possible to treat the substrate at a low temperature and form a uniform film on a large area of the substrate by reducing the RF power and the pressure.

Besides, since the plasma density is decreased in a low pressure, it is especially effective for upgrading the film quality to form the film by a method utilizing the magnetic field trapping effect.

Also, the method makes it possible to form a high quality hard carbon film at a relatively low temperature around the room temperature to 150° C., which is especially appropriate to produce the MIM device at a low temperature. Therefore, selectable materials used as the substrate are increased and the temperature of the substrate can be easily controlled, which also makes it possible to form a uniform film on a wide area of the substrate. Also, since the structure and characteristics of the film are widely controlled as shown in the table 1, it becomes possible to freely set the characteristic of the device. Further, since the dielectric constant of the film is 3 to 5 which is small in comparison to $Ta_2O_5$, $Al_2O_3$, and $SiN_x$ which are used in the related art MIM devices, the size of the device becomes large for the same capacity so that it becomes unnecessary to conduct a fine processing of the device in a high accuracy and the throughput of the device production is heightened. The ratio of the LCD capacity and the MIM capacity is needed at least $C_{LCD}: C_{MIM} = 10:1$ from the standpoint of driving condition of the device.

Also, the steepness of the device is represented as $\beta \propto 1/(\epsilon d)^{\frac{1}{2}}$. Therefore, according as the dielectric constant $\epsilon$ becomes small, the steepness is increased so that it becomes possible to enlarge the ratio of the on-current and the off-current, which makes it possible to drive the LCD at a low duty ratio and realize a high density LCD. Further, since the film is hard, the film is not easily damaged during the rubbing process at the time of sealing the liquid crystal material in the device, which also increases the throughput of the device.

As mentioned above, by using the hard carbon film, it becomes possible to realize a high density LCD having a satisfactory gradation characteristic at a low cost.

To control the resistivity of the film or heighten the stability, heat endurability or hardness of the film, if necessary, the film may be doped with impurities such as the group III elements of the periodical table, the group IV elements of the table, the group V elements of the table, alkali metal elements, alkaline earth metal elements, nitrogen atoms, oxygen atoms, chalcogen elements and halogen atoms. By doping the film with such impurities, the stability of the device and the design freedom of the device are further increased. The amount of the impurities is 5 atomic % or less with respect to the whole constituent atoms. Also, the amount of the group IV elements is 20 atomic % or less. The amount of the group V elements is 5 atomic % or less. The amount of the alkali metal elements is 5 atomic % or less. The amount of the alkaline earth metal elements is 5 atomic % or less. The amount of the nitrogen atoms is 5 atomic % or less. The amount of the oxygen atoms is 5 atomic % or less. The amount of the chalcogen elements is 20 atomic % or less. And the amount of the halogen atoms is 35 atomic % or less. The amount of the elements or the atoms described above can be measured by the customary method for elemental analysis, for example, by Auger analysis. Also, the amount of the impurities can be controlled in response to the other compounds contained in the starting material gas and the film forming conditions, etc.

The hard carbon film doped with the group IV element, the chalcogen element or the halogen element is extraordinarily improved regarding the stability of the film and the hardness thereof so that it becomes possible to realize an MIM device of high reliability.

The reason why the above mentioned effects can be obtained is, with respect to the group IV element and the chalcogen element, that the elements reduce the active double bonds which are present in the hard carbon film. Also, with present in the hard carbon film. Also, with respect to the halogen element, the reason is that, first, the decomposition of the starting material gas is accelerated due to the reaction of extracting hydrogen, thereby decreasing the dangling bonds in the film, and second, the halogen element X extracts the hydrogen in the C—H bond and substitutes therefor so as to form C—X bonds in the film instead of the C—H bonds, which increases the bonding energy since the bonding energy of C—X bond is larger than that of C—H bond.

In order to add one of the above mentioned elements, that is, the group III elements of the periodical table, the group IV elements of the table, the group V elements of the table, alkali metal elements, alkaline earth metal elements, nitrogen atoms, oxygen atoms, chalcogen elements and halogen elements, to the film as an ingredient thereof, a gas of a compound (or molecule) containing the additional element (or atom) is used as the starting material gas in addition to the hydrocarbon gas and the hydrogen gas.

As a compound containing the element belonging to the group III of the periodical table, there can be exemplified $B(OC_2H_5)_3$, $B_2H_6$, $BCl_3$, $BBr_3$, $BF_3$, $Al(O—i——C_3H_7)_3$, $(CH_3)_3Al$, $(C_2H_5)_3Al$, $(i— C_4H_9)_3Al$, $AlCl_3$, $Ga(O—i—C_3H_7)_3$, $(CH_3)_3Ga$, $(C_2H_5)_3Ga$, $GaCl_3$, $GaBr_3$, $(O—i—C_3H_7)_3In$, and $(C_2H_5)_3In$.

As a compound containing the element belonging to the group IV of the periodical table, there can be exemplified $Si_3H_8$, $(C_2H_5)_3SiH$, $SiF_4$, $SiH_2Cl_2$, $SiCl_4$, $Si(OCH_3)_4$, $Si(OC_2H_5)_4$, $Si(OC_3H_7)_4$, $GeCl_4$, $GeH_4$, $Ge(OC_2H_5)_4$, $Ge(C_2H_5)_4$, $(CH_3)_4Sn$, $(C_2H_5)_4Sn$, and $SnCl_4$.

As a compound containing the element belonging to the group V of the periodical table, there can be exemplified $PH_3$, $PF_3$, $PF_5$, $PCl_2F_3$, $PCl_2F$, $PCl_3$, $PBr_3$, $PO(OCH_3)_3$, $P(C_2H_5)_3$, $POCl_3$, $AsH_3$, $AsCl_3$, $AsBr_3$, $AsF_3$, $AsF_5$, $AsCl_3$, $SbH_3$, $SbF_5$, $SbCl_3$, and $Sb(OC_2H_5)_3$.

As a compound containing the element of alkali metal, there can be exemplified $LiO—i—C_3H_7$, $NaO—i—C_3H_7$, and $KO—i—C_3H_7$.

As a compound containing the element of alkaline earth metal, there can be exemplified $Ca(OC_2H_5)_3$, $Mg(OC_2H_5)_3$, and $(C_2H_5)_2Mg$.

As a compound containing the nitrogen atom, there can be exemplified a nitrogen gas, an inorganic compound such as ammonia, an organic compound having functional group such as amino group and cyano group, and a heterocyclic ring containing nitrogen, etc.

As a compound containing the oxygen atom, there can be exemplified inorganic compounds such as oxygen gas, ozone, water (steam), hydrogen peroxide, carbon monoxide, carbon dioxide, carbon sub-oxide, nitrogen monoxide, nitrogen dioxide, dinitrogen trioxide, dinitrogen pentoxide, nitrogen trioxide, etc.; organic compounds containing functional group or bonding such as hydroxy group, aldehyde group, acyl group, ketone group, nitro group, nitroso group, sulfone group, ether bonding, ester bonding, peptide bonding and heterocyclic ring containing oxygen; and metal alkoxide.

As a compound containing the chalcogen element, there can be exemplified $H_2S$, $(CH_3)(CH_2)_4S(CH_2)_4CH_3$, CH$_2$=CHCH$_2$SCH$_2$CH=CH$_2$, C$_2$H$_5$SC$_2$H$_5$, C$_2$H$_5$SCH$_3$, thiophene, H$_2$Se, (C$_2$H$_5$)$_2$Se, and H$_2$Te.

Further, as a compound containing the halogen element, there can be exemplified inorganic compounds such as fluorine, chlorine, bromine, iodine, hydrogen fluoride, chlorine fluoride, bromine fluoride, iodine fluoride, hydrogen chloride, bromine chloride, iodine chloride, hydrogen bromide, iodine bromide and hydrogen iodide; and organic compounds such as alkyl halide, aryl halide, styrene halide, polymethylene halide and haloform.

The MIM device having the featured insulator film as mentioned above is further featured in that the electrode of the pixel (picture element) is divided to at least two parts each being connected to the MIM device.

The MIM device in accordance with the present invention is described hereinafter with reference to the drawings and in comparison to the related art structure which the present invention is based on.

Figure 4:
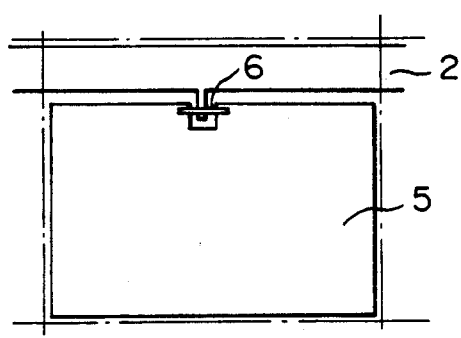
FIG. 4 is a plan view of a substrate of the liquid crystal display device relating to the present invention having an MIM device as the nonlinear resistance element of the device.

FIG. 4 illustrates a plan view of the MIM device of the related art. FIGS. 5 to 8 illustrate embodiments of the present invention.

In the structure of the related art of FIG. 4, one pixel (picture element) is composed of one electrode 5 which is connected to an upper electrode 2 through a switching device 6. If the device 6 should become inoperative caused by wire snapping or short circuit, the whole pixel (electrode 5) becomes unusable, which results in a defect of display.

Figure 5:
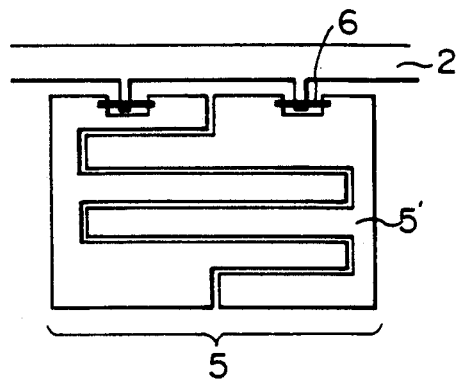
FIG. 5 is a plan view of an example of the substrate of the liquid crystal display device having an MIM device in accordance with the present invention.
Figure 6:
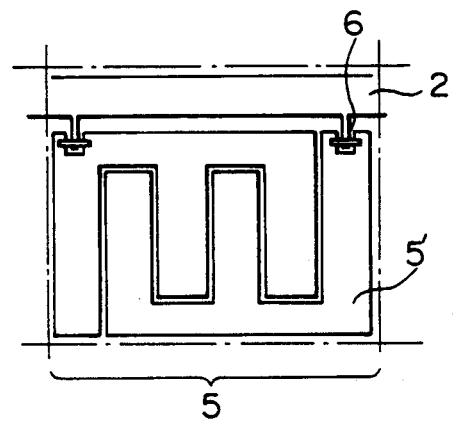
FIG. 6 is a plan view of another example of the substrate of the liquid crystal display device having an MIM device in accordance with the present invention.
Figure 7:
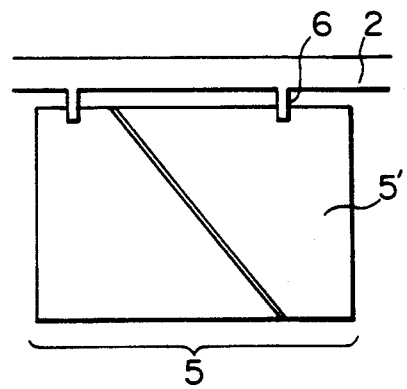
FIG. 7 is a plan view of still another example of the substrate of the liquid crystal display device having a MIM device in accordance with the present invention.
Figure 8:
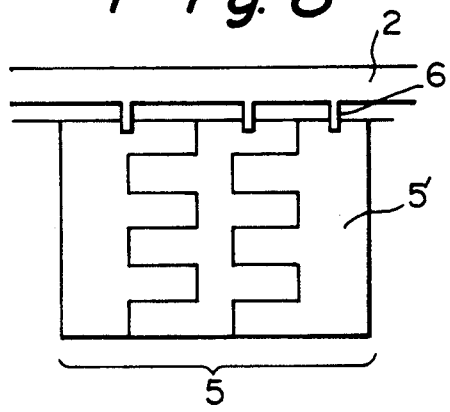
FIG. 8 is a plan view of still another example of the susbtrate of the liquid crystal display device having an MIM device in accordance with the present invention.

On the other hand, in the structure of FIG. 5 in accordance with an embodiment of the present invention, the pixel electrode 5 is divided to two electrode parts 5'. Each part 5' is connected to an upper electrode 2 through a switching device 6 which is constituted by an MIM device. The shape of the divided parts 5' is not limited to that of the horizontally combined interdigital combs as illustrated in FIG. 5. Other examples of divisional shape are illustrated in FIGS. 6 to 8. Any shape can be selected on the condition that each part 5' evenly functions to light the whole pixel in the normal display operation. FIG. 6 illustrates another example of the pixel electrode 5 comprising a pair of vertically combined interdigital comb shaped parts 5'. Also, FIG. 7 illustrates still another example of the pixel electrode 5 comprising a pair of obliquely divided parts 5'. By such a divisional structure of the pixel electrode 5, it becomes possible to decrease the accidental defect of display, which attenuates the decline of throughput of the device.

The pixel electrode 5 may be divided to three parts 5' as illustrated in FIG. 8. Further, the electrode may be divided to more than three parts.

A method for producing the switching element (MIM device) of the present invention is described hereinafter.

Figure 9:
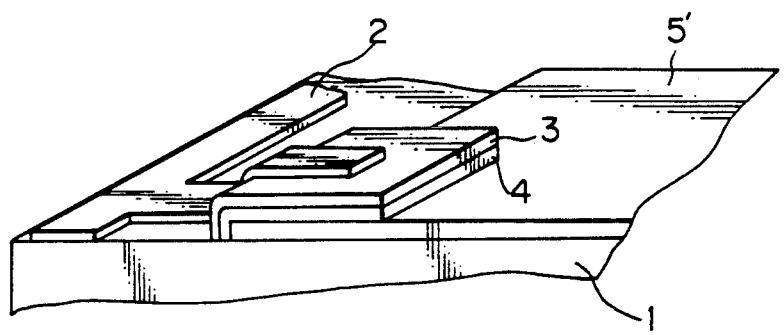
FIG. 9 is an explanatory view for explaining a method for producing the substrate having the MIM device of the present invention.

First, as illustrated in FIG. 9, a transparent electrode pattern is formed on a substrate 1 to constitute a pixel electrode 5'. Also, on the substrate 1, a thin conductive film of auxiliary electrode 4 is formed by a vacuum deposition method or a sputtering method. The pattern of the electrode 4 is formed by a wet etching process or a dry etching process. On the electrode 4, a hard carbon film 3 is formed by a plasma CVD method or an ion beam method. The pattern of the film 3 is formed by a dry etching method, a wet etching method or a lift off method using a resist agent. The film 3 constitutes an insulator film. On the film 3, a bus line 2 which also constitutes an upper electrode is formed by a vacuum deposition method or a sputtering method and patterned to form a predetermined shape of pattern. After that, unnecessary portions are removed from the electrode 4 so that the pixel electrode 5' is exposed.

Figure 10:
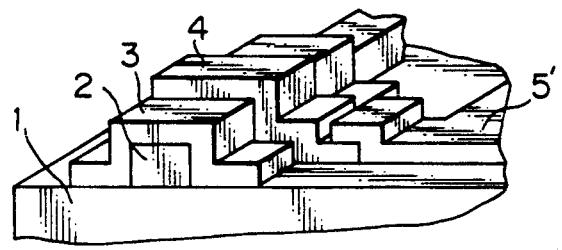
FIG. 10 is another explanatory view for explaining the method for producing the substrate having the MIM element of the present invention.

FIG. 10 illustrates another structure of the MIM device of the present invention.

In this structure, a bus line 2 which constitutes a lower electrode is formed on the substrate 1. The electrode 2 is covered by an insulation film 3. An auxiliary electrode 4 which constitutes an upper electrode is formed on the film 3. After that, a thin film of transparent electrode is formed by a vacuum deposition method or a sputtering method. The thin film is patterned to form a pixel electrode which overlaps the electrode 4 to be connected.

The structure of the MIM device is not limited to those illustrated in FIGS. 9 and 10. There are many variants of the MIM device structure such as: one which comprises an uppermost transparent electrode which is formed after the MIM is formed; one in which the transparent electrode also constitutes the upper or lower electrode; and one in which the MIM device is formed on the side portion of the lower electrode.

It is to be noted that each of the upper electrode, the lower electrode and the pixel electrode is about several hundred to several thousand Å thick. Also, the thickness of the hard carbon film is 100 to 8000 Å, desirably 200 to 6000 Å, further desirably 300 to 4000 Å.

A liquid crystal display device comprising the above mentioned MIM device is constituted as follows. That is, a first substrate on which the MIM device is formed as mentioned above and a second substrate which has stripe shaped common electrodes formed thereon are prepared. A liquid crystal layer is formed between the first and second substrate by a normal method.

A feature of the MIM device used in the liquid crystal display device in accordance with the present invention is that the device comprises an insulation substrate, a lower electrode formed on the substrate, a hard carbon insulator film and an upper electrode, wherein a plurality of MIM devices are connected to one pixel in series.

The insulator film used in the MIM device is made from the hard carbon film which is constituted from material containing at least one of amorphous and microcrystalline material comprising carbon atoms and hydrogen atoms as the main constituent elements. The hard carbon film is also referred to as an i—C film, a diamond-like carbon film, an amorphous diamond film or a diamond thin film.

One of the features of the hard carbon film is that the film is deposited in gas phase so that the various characteristics thereof can be widely controlled in response to the conditions under which the film is deposited. Therefore, the hard carbon film can cover the resistivity range from semiinsulator region to insulation region so that the film can be used not only as an insulator but also as a semiinsulator. Therefore, the MIM device of the present invention may also be referred to as MSI (Metal-Semi-Insulator).

Figure 11A:
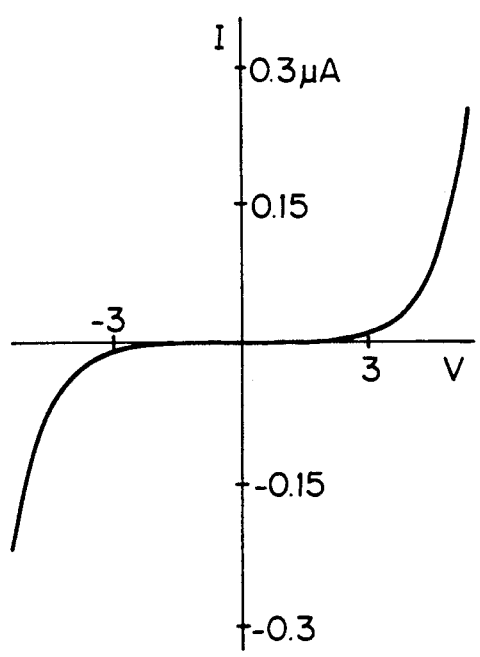
FIGS. 11a and 11b are graphical views of the I-V characteristic of the MIM device.
Figure 11B:
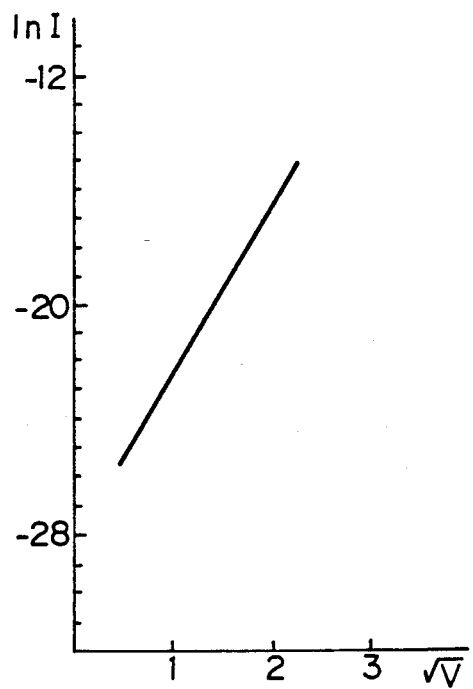

The current-voltage characteristic of the MIM device in accordance with the present invention is represented in FIGS. 11a and 11b. The characteristic is approximately represented by the following equations.

$$I = \chi \exp(\beta V^{\frac{1}{2}}) \tag{1}$$

wherein
I: Current,

V: Applied voltage,
χ: Conductive coefficient,
β: Pool-Frenkel coefficient.

$$\chi = \frac{n\mu q}{d} \exp\left(\frac{-\Phi}{kT}\right) \propto \frac{1}{\rho d} \quad (T\text{:const.}) \quad (2)$$

$$\beta = \frac{1}{kT}\left(\frac{q^3}{\pi\epsilon_1\epsilon_0 d}\right)^{\frac{1}{2}} \propto \frac{1}{\sqrt{\epsilon_1 d}} \quad (T\text{:const.}) \quad (3)$$

wherein
n: Carrier density,
μ: Carrier mobility,
q: Electron charge amount,
Φ: Trap depth,
ρ: Specific resistivity,
d: Hard carbon film thickness,
k: Boltzmann constant,
T: Atmosphere temperature,
$\epsilon_1$: Dielectric constant of hard carbon,
$\epsilon_2$: Dielectric constant of vacuum.

Figure 12:
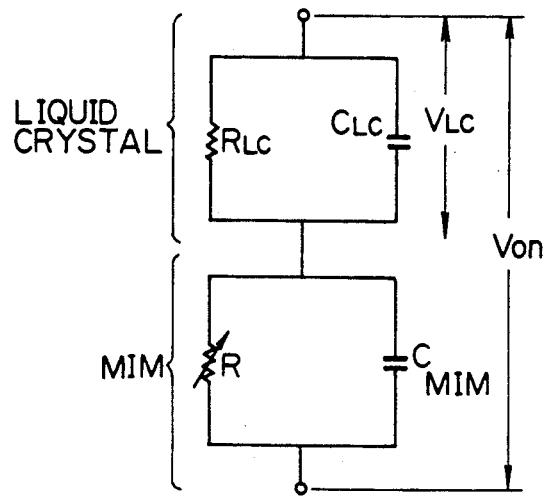
FIG. 12 is an explanatory view of an equivalent circuit of one pixel of the liquid crystal display device using an MIM device.
Figure 13A:
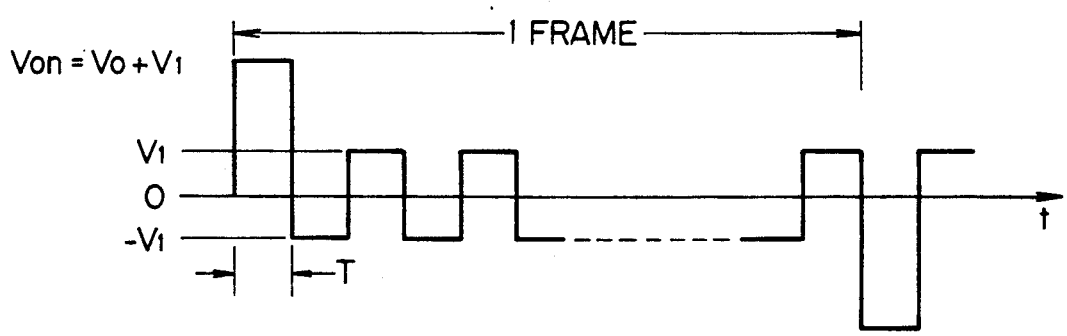
FIGS. 13a and 13b are graphical views for explaining the driving voltage of the liquid crystal.
Figure 13B:
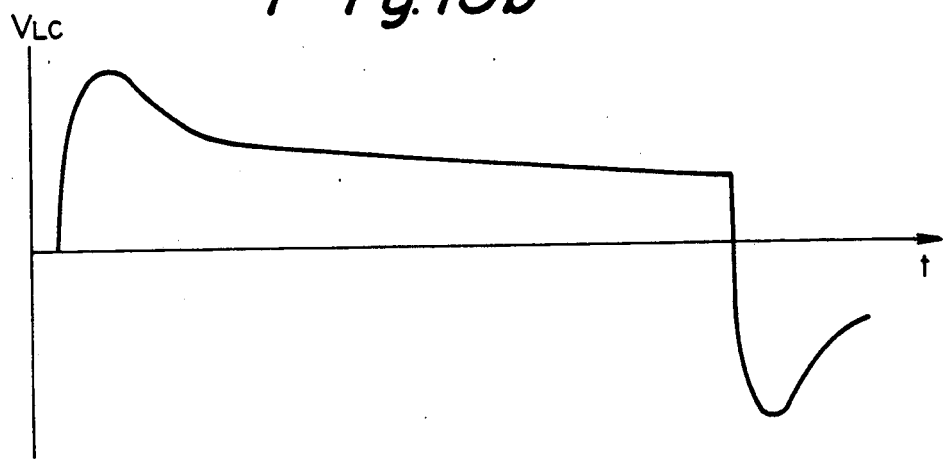

FIG. 12 illustrates an equivalent circuit diagram of one pixel of the LCD device using the MIM device. Also, FIGS. 13a and 13b illustrate waveforms of the drive voltage applied to the selected pixel and both ends of the liquid crystal, respectively.

A necessary condition for driving the liquid crystal is that the driving voltage (Von) is within an appropriate range. The lower limit is threshold voltage of the liquid crystal, that is, about 1.5 V. The upper limit is the dielectric breakdown voltage of the circuit, that is, about 25 V. Therefore, $$1.5 \text{ V} \lesssim \text{Von} \lesssim 25 \text{ V} \quad (4)$$

Another necessary condition for driving the liquid crystal is that sufficient data can be written in a selected time period. For this purpose, it is necessary to set the writing time (charge time) Ton shorter than the width T of the selected pulse.

$$\text{Ton} \geq C_{LC} \cdot \text{Ron} = C_{LC} \cdot \text{Von}/\text{Ion}$$

T=(frame frequency Tf)/(scanning line number N)=$1.6 \times 10^{-2}/N$ (sec)

wherein
$C_{LC}$: Liquid crystal capacity,
Ron: ON resistance of MIM device,
Ion: ON current of MIM device,
Von: ON voltage of MIM device.
Therefore, $$C_{LC} \cdot \text{Von}/\text{Ion} \lesssim 1.6 \times 10^{-2}/N$$

That is, $$\text{Ion} \gtrsim \text{Von} \cdot C_{LC} \cdot N/1.6 \times 10^{-2}$$

Assuming that $C_{LC}=1.6\times 10^{-12}$, $\epsilon_r=13.5$, the pixel size is 300×300 μm and the cell gap is 7.5 μm, the following equation is obtained.

$$\text{Ion} \gtrsim \text{Von} \cdot N \times 10^{-10} \text{ (A)} \quad (5)$$

Still another necessary condition for driving the liquid crystal is that the writing state is held during the time period of one frame. For this purpose, the holding time (discharge time) Toff is set longer than the frame frequency Tf.

$$\text{Toff} \leq C_{LC} \cdot \text{Roff} = C_{LC} \cdot \text{Voff}/\text{Ioff}$$

Tf=$1.6 \times 10^{-4}$ (sec)

Roff: OFF resistance of MIM device,
Ioff: OFF current of MIM device,
Voff: OFF voltage of MIM device.
Therefore, $$C_{LC} \cdot \text{Voff}/\text{Ioff} < 1.6 \times 10^{-2}$$

That is, $$\text{Ioff} < \text{Voff} \times 10^{-10} \text{ (A)} \quad (6)$$

$$(C_{LC}=1.6 \times 10^{-12})$$

Figure 14:
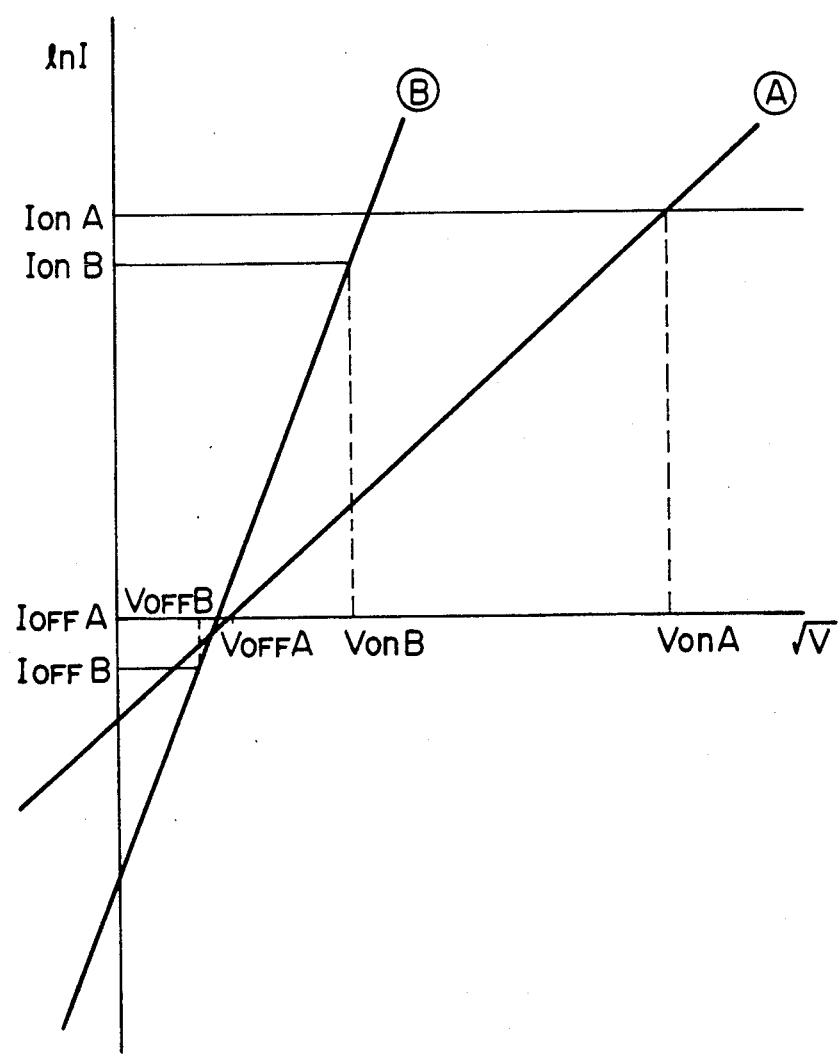
FIG. 14 is a graphical view representing $\ln I$ with respect to $V^{\frac{1}{2}}$.

The current-voltage characteristic of the MIM device can be changed by changing β and χ. FIG. 14 graphically illustrates the characteristic. As can be seen from the graph, when the driving voltage Von is maximum (line A), the slope β of the line $\ln I - \sqrt{V}$ becomes minimum and the intercept χ becomes maximum. In this state, it is derived from the equations (2) and (3) that the thickness d of the hard carbon film becomes maximum and the specific resistivity becomes minimum.

Similarly, when the driving voltage Von is minimum (line B), the slope β becomes maximum and the intercept χ becomes minimum, that is, the thickness d becomes minimum and the resistivity ρ becomes maximum.

As can be seen from the equivalent circuit diagram of FIG. 12, the voltage V which is applied to the MIM device when the voltage Vin is applied in accordance with the capacity divisional way is represented by the equation $$V = \frac{C_{LC}}{C_{LC} + C_{MIN}} V_{in}$$

wherein
$C_{MIM}$: Capacity of MIM device,
$C_{LC}$: Capacity of liquid crystal.
To apply the most voltage to the MIM device, it is necessary that $$C_{MIM} << C_{LC}$$

so that the ratio is set as $$C_{MIM}/C_{LC}=1/10 \text{ or less.}$$

As described later, the dielectric constant of the hard carbon film is small, that is, about 3 to 5. Therefore, it is easy to satisfy the above mentioned restrictive conditions without reducing the device surface very much. However, it is desirable that the MIM device size is about 10×10 μm for the pixel size which is about 300×300 μm from the standpoint of panel opening ratio.

When the MIM size is 10×10 μm and N=400 (1/400 duty), the maximum of the film thickness d and the minimum of the specific resistivity ρ are determined as follows. This condition corresponds to the line A of FIG. 14.

If the value of $\rho$ is settled, the critical value of Ion which satisfies the equation (5) can be obtained by giving the value Von so that the thickness d can be calculated from the equations (1), (2) and (3).

Figure 15:
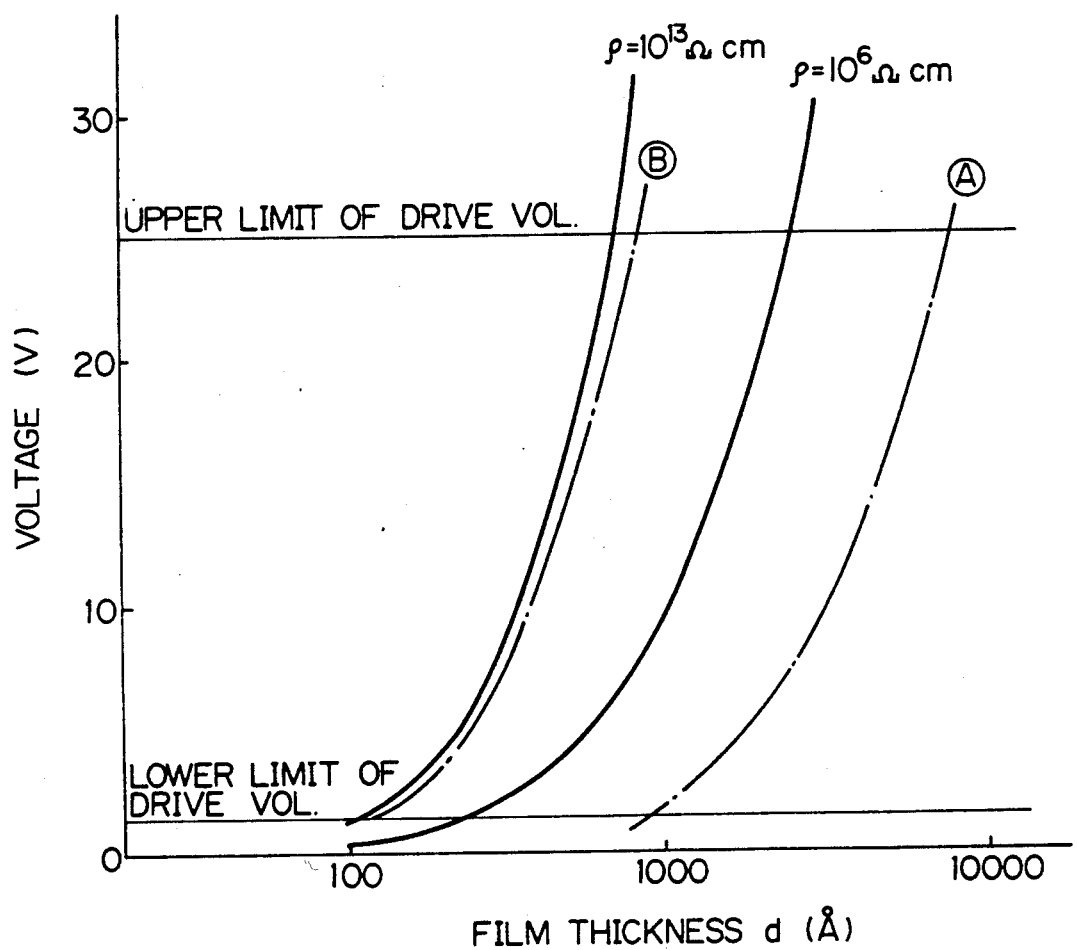
FIG. 15 is a graphical view representing the driving voltage and the dielectric breakdown voltage with respect to the film thickness.

The curve A in FIG. 15 represents the relation between the film thickness d and the driving voltage Von and the dielectric breakdown voltage Vb on the condition that $\rho = 10^6$ $\Omega$cm. As can be seen from the graph, there is sufficient margin between the voltages Von and Vb. Also, on the condition Von$\lesssim$25 V, it becomes d$\lesssim$8000 Å.

It is to be noted that it is not desirable to set $\rho < 10^6$ $\Omega$cm, since the current of the unlighted pixel is increased and cross-talk occurs.

Next, the minimum of the film thickness d and the minimum of the resistivity $\rho$ are determined as follows. This condition corresponds to the line B in FIG. 15.

The line B in FIG. 15 represents the relation between the thickness d and the voltages Von and Vb. As can be seen from the graph, when d<100 Å, Von<1.5 V, which means that it becomes difficult to drive the liquid crystal and that the difference between the voltages Von and Vb becomes too small to drive the device. Therefore, it is necessary to set as d$\gtrsim$100 Å.

Figure 16:
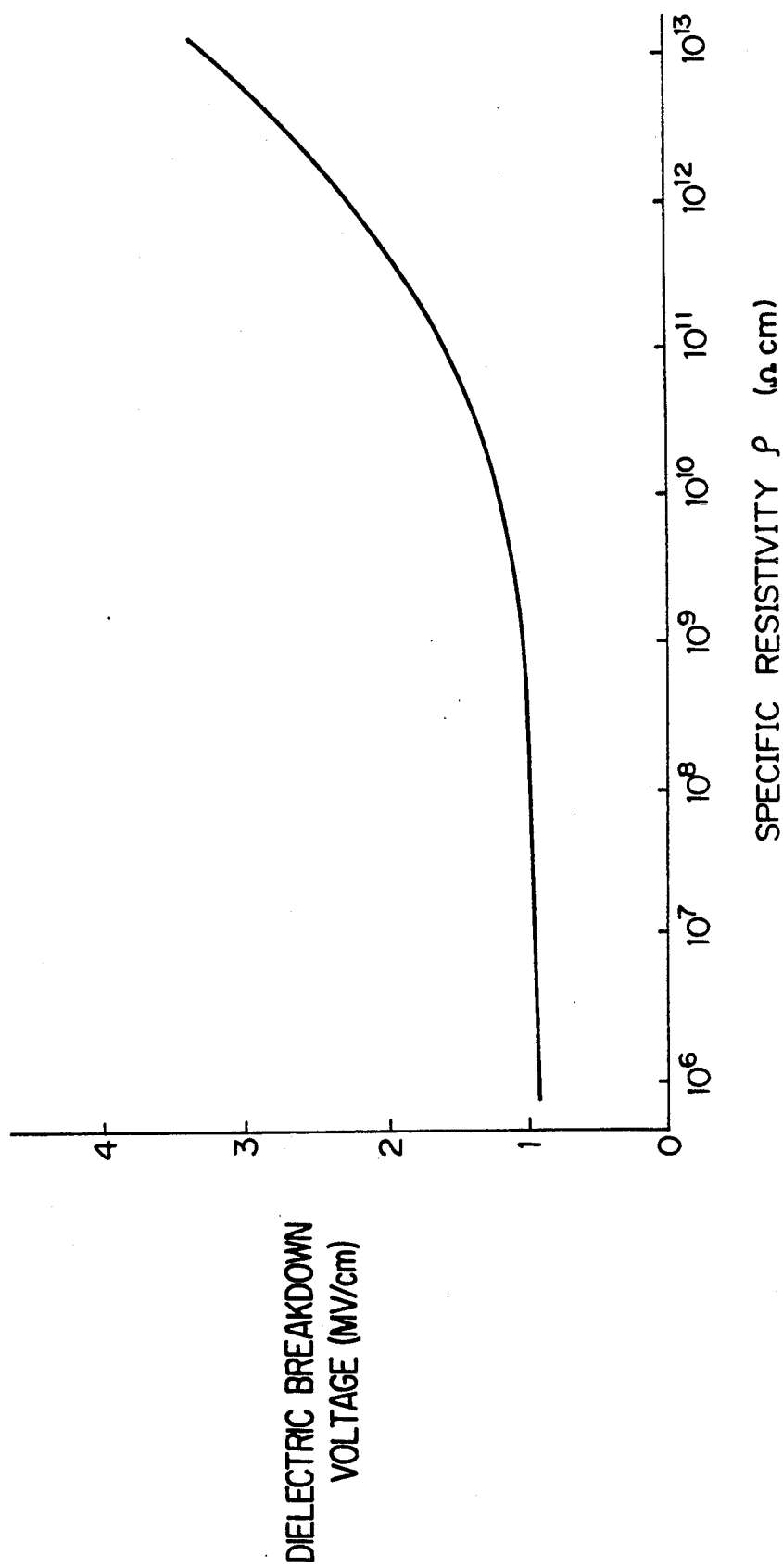
FIG. 16 is a graphical view representing the dielectric strength voltage with respect to the specific resistivity.

FIG. 16 graphically illustrates the dielectric breakdown voltage with respect to the specific resistivity $\rho$. As can be seen from the graph, the voltage increases according as $\rho$ increases. However, the increasing ratio of the driving voltage exceeds the increase of the dielectric breakdown voltage, which can be seen from the curves A and B in FIG. 15, so that when $\rho > 10^{13}$ $\Omega$cm, the difference between the voltages Von and Vb becomes zero for entire range of the film thickness, which means that it is impossible to drive the device.

Considering the above mentioned points, with regard to the hard carbon film used as the insulator film of the MIM device, it is desirable that the film thickness is 100 to 8000 Å and the specific resistivity is $10^6$ to $10^{13}$ $\Omega$cm. Further, when considering the margin of the driving voltage and the tolerable voltage (dielectric breakdown voltage), the film thickness is desirably 200 Å or more. Also, to minimize the unevenness of the color due to the cell gap between the pixel portion and the MIM portion, the film thickness is desirably 6000 Å or less. Therefore, it is further desirable that the hard carbon film thickness is 200 to 6000 Å and the specific resistivity is $5 \times 10^6$ to $10^{12}$ $\Omega$cm.

Also, the defect number of the element due to the pin holes in the hard carbon film increases according as the film thickness is decreased. Especially, the defect number sharply increases to the extent that the defect ratio exceeds 1% when the film thickness is below 300 Å. Also, when the film is too thin, the evenness of the film thickness is impaired, which impairs the element characteristic. More specifically, when the film thickness is decreased to about 30 Å or less, the thickness becomes uncontrollable and the unevenness of the film thickness exceeds 10%. Accordingly, it is further desirable that the film is 300 Å thick or more.

Also, to prevent the separation of the film due to the stress and drive the device at a low duty ratio, preferably 1/1000 or less, it is especially desirable that the film is 4000 Å thick or less.

Accordingly, it is particularly desirable that the thickness of the hard carbon film is 300 to 4000 Å and the specific resistivity thereof is $10^7$ to $10^{11}$ $\Omega$cm.

Now, there are investigated preferable conditions for realizing color display by using the hard carbon film according to the present invention.

Assuming that $\epsilon_1$ equals to $\epsilon_\gamma$ in the aforementioned equation (3), the Pool-Frenkel coefficient $\beta$ is represented by the following equation (3').

$$\beta = \frac{1}{KT}\left(\frac{q^3}{\pi \cdot \epsilon_\gamma \cdot \epsilon_0}\right)^{\frac{1}{2}} \alpha \frac{1}{\sqrt{\epsilon_\gamma \cdot d}} \quad (T\text{:const.}) \quad (3')$$

wherein
K: Boltzmann constant,
T: Atmospheric temperature,
q: Electron charge amount
$\epsilon_\gamma$: Specific dielectric constant of hard carbon
$\epsilon_0$: Dielectric constant of vacuum
d: Film thickness of hard carbon From the equation (3'), it is understood that the Pool-Frenkel coefficient $\beta$ is determined by film thickness d of the hard carbon and specific dielectric constant $\epsilon_\gamma$ of the hard carbon.

The results shown in the following table 2 are obtained by calculating corresponding film thicknesses d in 3 to 5 of $\beta$ and 2.0 to 6.0 of $\epsilon_\gamma$ on the basis of the equation (3').

TABLE 2

| | Film thickness (Å) calculated from $\epsilon_\gamma$ and $\beta$ | | | | |
|---|---|---|---|---|---|
| | | | $\beta$ | | |
| $\epsilon_\gamma$ | 5 | 4.5 | 4 | 3.5 | 3 |
| 2.0 | 1700 | 2100 | 2600 | 3500 | 4600 |
| 3.0 | 1100 | 1400 | 1750 | 2300 | 3100 |
| 3.5 | 950 | 1200 | 1500 | 1950 | 2600 |
| 4.0 | 850 | 1050 | 1300 | 1750 | 2300 |
| 4.5 | 750 | 950 | 1200 | 1550 | 2000 |
| 5.0 | 700 | 850 | 1100 | 1400 | 1900 |
| 6.0 | 550 | 700 | 900 | 1150 | 1600 |

In order to realize a gradation display by employing the hard carbon film, it is desirable that the value of $\beta$ is in a range of 3 to 4, and in order to facilitate control of specific dielectric constant $\epsilon_\gamma$ of the hard carbon film to be produced in the process of producing the hard carbon film, production of the hard carbon film having $\epsilon_\gamma$ of 3.0 to 5.0 is desirably aimed.

The film thickness d for satisfying the above two conditions proves to be in a range of 1100 to 3100 Å from the above table 2.

Accordingly, in order to realize the gradation display by employing the hard carbon film, the film thickness of the hard carbon is desirably set to a value of 1100 to 3100 Å.

The hard carbon film doped with the group IV element, the chalcogen element or the halogen element is extraordinarily improved regarding the stability of the film and the hardness thereof so that it becomes possible to realize an MIM device of high reliability.

The reason why the above mentioned effects can be obtained is, with respect to the group IV element and the chalcogen element, that the elements reduce the active double bonds which are present in the hard carbon film. Also, with respect to the halogen element, the reason is that, first, the decomposition of the starting material gas is accelerated due to the reaction of extracting hydrogen, thereby decreasing the dangling bond in the film, and second, the halogen element X extracts the hydrogen in the C—H bond and substitutes therefor so as to form C—X bonds in the film instead of the C—H bonds, which increases the bonding energy since the bonding energy of C—X bond is larger than that of C—H bond.

In order to add one of the above mentioned elements, that is, the group III elements of the periodical table, the group IV elements of the table, the group V elements of the table, alkali metal elements, alkaline earth metal elements, nitrogen atoms, oxygen atoms, chalcogen elements and halogen elements, to the film as an ingredient thereof, a gas of a compound (or molecule) containing the additional element (or atom) is used as the starting material gas in addition to the hydrocarbon gas and the hydrogen gas.

As a compound containing the element belonging to the group III of the periodical table, there can be exemplified $B(OC_2H_5)_3$, $B_2H_6$, $BCl_3$, $BBr_3$, $BF_3$, $Al(O—i—C_3H_7)_3$, $(CH_3)_3Al$, $(C_2H_5)_3Al$, $(i—C_4H_9)_3Al$, $AlCl_3$, $Ga(O—i—C_3H_7)_3$, $(CH_3)_3Ga$, $(C_2H_5)_3Ga$, $GaCl_3$, $GaBr_3$, $(O—i—C_3H_7)_3In$, and $(C_2H_5)_3In$.

As a compound containing the element belonging to the group IV of the periodical table, there can be exemplified $SiH_4$, $Si_2H_6$, $Si_3H_8$, $(C_2H_5)_3SiH$, $SiF_4$, $SiH_2Cl_2$, $SiCl_4$, $Si(OCH_3)_4$, $Si(OC_2H_5)_4$, $Si(OC_3H_7)_4$, $GeCl_4$, $GeH_4$, $Ge(OC_2H_5)_4$, $Ge(C_2H_5)_4$, $(CH_3)_4Sn$, $(C_2H_5)_4Sn$, and $SnCl_4$.

As a compound containing the element belonging to the group V of the periodical table, there can be exemplified $PH_3$, $PF_3$, $PF_5$, $PCl_2F_3$, $PCl_2F$, $PCl_3$, $PBr_3$, $PO(OCH_3)_3$, $P(C_2H_5)_3$, $POCl_3$, $AsH_3$, $AsCl_3$, $AsBr_3$, $AsF_3$, $AsF_5$, $AsCl_3$, $SbH_3$, $SbF_5$, $SbCl_3$, and $Sb(OC_2H_5)_3$.

As a compound containing the element of alkali metal, there can be exemplified $LiO—i—C_3H_7$, $NaO—i—C_3H_7$, and $KO—i—C_3H_7$.

As a compound containing the element of alkaline earth metal, there can be exemplified $Ca(OC_2H_5)_3$, $Mg(OC_2H_5)_3$, and $(C_2H_5)_2Mg$.

As a compound containing the nitrogen atom, there can be exemplified a nitrogen gas, an inorganic compound such as ammonia, an organic compound having functional group such as amino group and cyano group, and a heterocyclic ring containing nitrogen, etc.

As a compound containing the oxygen atom, there can be exemplified inorganic compounds such as oxygen gas, ozone, water (steam), hydrogen peroxide, carbon monoxide, carbon dioxide, carbon sub-oxide, nitrogen monoxide, nitrogen dioxide, dinitrogen trioxide, dinitrogen pentoxide, nitrogen trioxide, etc.; organic compounds containing functional group or bonding such as hydroxy group, aldehyde group, acyl group, ketone group, nitro group, nitroso group, sulfone group, ether bonding, ester bonding, peptide bonding and heterocyclic ring containing oxygen; and metal alkoxide.

As a compound containing the chalcogen element, there can be exemplified $H_2S$, $(CH_3)(CH_2)_4S(CH_2)_4CH_3$, $CH_2=CHCH_2SCH_2CH=CH_2$, $C_2H_5SC_2H_5$, $C_2H_5SCH_3$, thiophene, $H_2Se$, $(C_2H_5)_2Se$, and $H_2Te$.

Further, as a compound containing the halogen element, there can be exemplified inorganic compounds such as fluorine, chlorine, bromine, iodine, hydrogen fluorine, chlorine fluoride, bromine fluoride, iodine fluoride, hydrogen chloride, bromine chloride, iodine chloride, hydrogen bromide, iodine bromide and hydrogen iodide; and organic compounds such as alkyl halide, aryl halide, styrene halide, polymethylene halide and haloform.

As mentioned above, by using the hard carbon film as the insulator film of the MIM device, it becomes possible to realize an LCD of high accuracy at a low cost. Further, by connecting a plurality of such MIM devices to one pixel, it becomes possible to reduce the display defects and unevenness of the device characteristic so that LCDs of high density can be manufactured at a low cost.

In the case wherein two MIM devices are connected in series, the electric capacity C of the whole structure is represented by the following equation $$C=C_A C_B/(C_A+C_B)$$

wherein $C_A$ and $C_B$ represent the capacity values of the two MIMs, respectively.

If the two MIMs have the same area, it becomes that $C=C_A/2$ so that the pixel of the display is driven by the MIMs having the total area twice as large as one MIM. Further, if three or more MIMs are connected in series, the area of the driving MIMs increases three times or more, accordingly. Due to the arrangement of the plurality of MIMs for one pixel, if one of the MIMs should fail to properly function in accordance with the normal non-linearity thereof or become inoperative caused by short circuit of the MIM, the pixel can be driven by the remaining MIMs so that the defect of luminous emission failure of the pixel can be avoided. Also, since the area of the MIMs becomes twice or more as large as that of the prior art structure which comprises a single MIM for each pixel, the unevenness of the device area can be attenuated so that uniform MIMs of high quality can be manufactured and throughput thereof is increased.

Those advantages mentioned above may be obtained to some degree even when the insulator layer of the MIM is made from a material other than the hard carbon film. However, the advantages are remarkable when the hard carbon film is used as the insulator of the MIM for the reasons described below.

The dielectric constant of the hard carbon film is relatively small and the surface area of the MIM is large when compared to the other materials. For example, in comparison to the $Ta_2O_5$ MIM having a size of $5 \mu m \times 5 \mu m$, the size of the hard carbon film MIM having the same characteristic is $10 \mu m \times 10 \mu m$. The advantages mentioned above become large according as the surface area of the MIM device is enlarged, since the characteristic of the device is not impaired in the patterning process regardless of the surface area of the device. Also, with respect to the anodic oxidized film, if two MIMs are to be connected in series, since the film structure is not symmetric, two MIM devices having polarities reversed from each other desirably have to be combined together to form a symmetric device structure. Therefore, the number of MIMs combined together has to be even. If odd MIMs are combined together, the device forms an unsymmetrical structure which impairs the functional feature of the MIM when used as the switching means of the LCD.

On the other hand, since the MIM device including the hard carbon film is inherently excellent in its symmetry and exhibits a value of 0.75 to 1.25 in a ratio of the minus biassed current $I-$ with respect to the plus-minus biassed current $I+$ ($I-/I+$), odd numbers of MIM devices including the carbon film can be connected to one another without impairing their functional features. Accordingly, application of the hard carbon film to MIM device makes it possible to increase the design freedom of the device so as to realize an LCD of high density and high quality at a low cost.

The more MIMs connected in series, the better since the surface area is enlarged so that the occurrence of defect pixels is minimized. However, from the view point of opening ratio of the device, it is desirable that the number of MIMs is 20 or less for one pixel of one substrate, more preferably 10 or less. Most desirably, the number of MIMs is 2 to 4.

Figure 17:
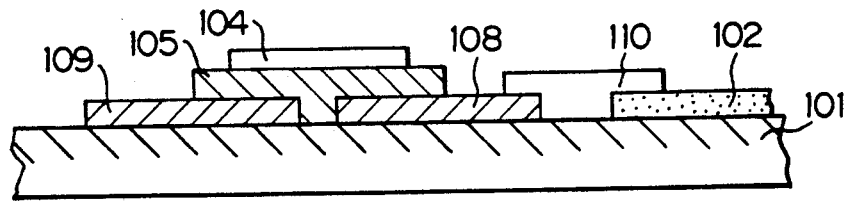
FIG. 17 is a sectional view of an MIM device for explaining the structure thereof.
Figure 18:
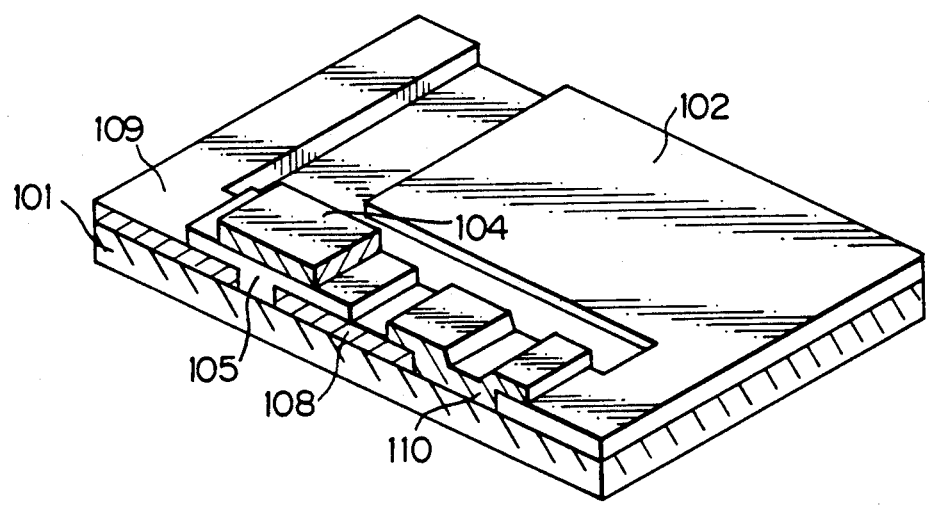
FIG. 18 is a perspective view of the MIM device of FIG. 17.

The MIM device in accordance with the present invention is illustrated in FIGS. 17 and 18. The device is fabricated as follows.

First, a transparent electrode 102 is formed on an insulator substrate 101. The electrode 102 is etched by a dry etching method or a wet etching method to form a predetermined pattern.

Next, a metallic thin film for a lower electrode and a scanning electrode is formed by a vacuum deposition method or a sputtering method. The film is etched by a wet etching method or a dry etching method to form a predetermined pattern of lower electrode 108 and a predetermined pattern of scanning electrode (common electrode) 109.

After that, the electrodes 108 and 109 are covered by a hard carbon film by a plasma CVD method or an ion beam method. The hard carbon film is patterned by a dry etching method, a wet etching method or a lift-off method using a resist agent to form a predetermined pattern of hard carbon insulator film 105.

After that, the film 105 is covered by a metallic thin film for an upper electrode and an auxiliary electrode by a vacuum deposition method or a sputtering method. This film is patterned to form a predetermined pattern of an upper electrode 104 and a predetermined pattern of an auxiliary electrode 110.

In accordance with the constitution fabricated as described above, two MIM structures are connected in series for one pixel.

Another arrangement is possible wherein the MIM structures are directly formed on the pixel electrode and the common electrode without using the auxiliary electrode.

Further arrangement is possible wherein a plurality of MIM structures are formed on the pixel electrode and a plurality of MIM structures are also formed on the common electrode.

Various modifications are possible other than those mentioned above.

The lower electrode 108, the upper electrode 104 and the transparent electrode 102 are several hundred to several thousand Å thick. The hard carbon film is 100 to 8000 Å thick, desirably 200 to 6000 Å thick, further desirably 300 to 4000 Å thick.

To cope with this point, another feature of the present invention resides in that each pixel electrode is connected to two scanning electrode lines through the MIM devices so as to avoid the defects of display. More precisely, with regard to the wire snapping, by the arrangement of two electrode lines for one pixel electrode, if one of the lines is snapped, it becomes possible to apply an electric charge to the liquid crystal layer through the remaining normal line. Also, with regard to the problem due to the short circuit of the device, it becomes possible to repair the defect of display by removing the short circuited MIM device of the two MIM devices constituting the defect pixel by an appropriate method such as irradiating a laser beam so as to drive the pixel by the remaining normal MIM.

Figure 19:
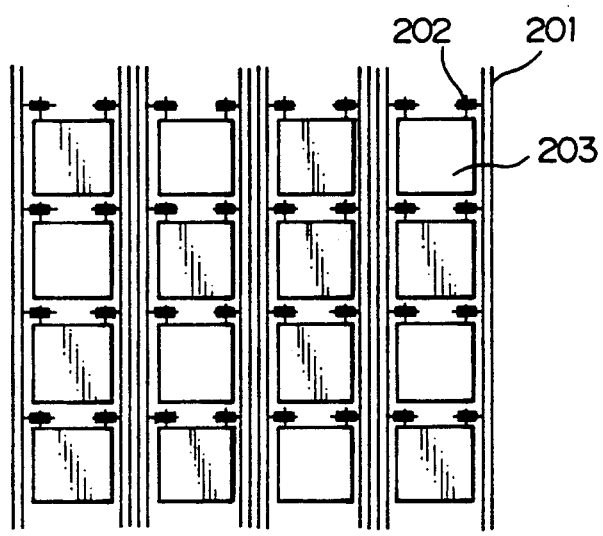
FIG. 19 is a constructional view of an example of the electrode arrangement of the liquid crystal display device in accordance with the present invention.

FIG. 19 illustrates a layout of electrodes formed on one of the substrates (not shown) constituting the LCD. In the drawing, numeral 201 designates a scanning electrode, numeral 202 designates an MIM device and numeral 203 designates a pixel electrode, respectively.

Figure 20A:
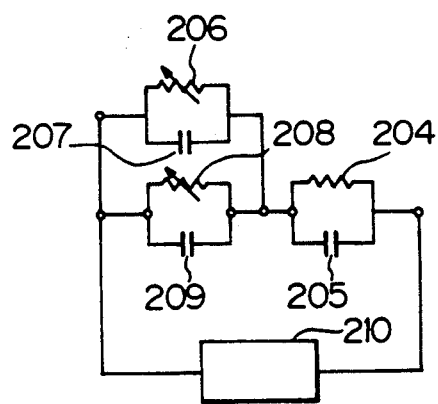
FIGS. 20a and 20b are circuit diagrams of examples of an equivalent circuit of the pixel of the liquid crystal display device using the substrate of FIG. 19.

FIG. 20a illustrates an equivalent circuit diagram of one pixel of the liquid crystal display device comprising the electrode layout of FIG. 19 representing a normal state wherein the two MIM devices and the two scanning lines connected to the pixel are normally functions.

Figure 20B:
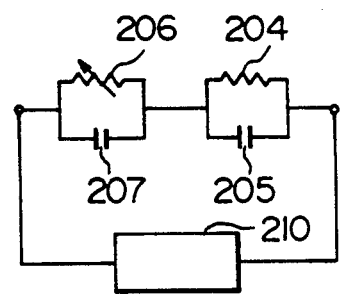

On the other hand, FIG. 20b illustrates an equivalent circuit diagram of the pixel of FIG. 20a in a state wherein one of the MIM devices is short circuited and removed by irradiating a laser beam. In FIGS. 20a and 20b, numeral 204 designates a resistance of the liquid crystal, numeral 205 designates a capacitor of the liquid crystal, numerals 206 and 208 designate a resistance of the MIM device, numerals 207 and 209 designate a capacitor of the MIM device and numeral 210 designates a drive means.

When a drive voltage Von is applied to the circuit from the drive means 210, the voltage V which is applied to the MIM device is represented by $$V = \frac{C_{LCD}}{C_{LCD} + C_{MIN}} V_{on}$$

wherein $C_{LCD}$ designates the capacitance of the liquid crystal and $C_{MIM}$ designates the capacitance of the combined MIM devices.

It is to be noted that, in the state of FIG. 20a, the surface area of MIM devices is twice as large as that in the state of FIG. 20b. However, the voltage V of FIG. 20a is low compared to the state of FIG. 20b for a same driving voltage Von since the capacitance of the MIM of FIG. 20a is twice as large as that of FIG. 20b. Therefore, the total current which passes through the MIM devices of FIG. 20a does not differ very much from the current which passes through the MIM device of FIG. 20b.

Also, as mentioned before, to supply the MIM device with sufficient voltage, it is necessary that $C_{MIN} << C_{LCD}$. Therefore, the ratio of the capacitances is set as $C_{MIM}:C_{LCD}=1:10$, as mentioned before. The capacitance is proportional to the area of the device. Therefore, when two MIM devices are connected in parallel to the pixel, it becomes necessary to reduce the area of each MIM device to half of the area of MIM device in the arrangement of only one MIM device is used. However, as mentioned before, the specific dielectric constant of the hard carbon film is relatively low, that is, 3 to 5, so that it is unnecessary to reduce the size of the MIM device, which is also one of advantageous points of the MIM device using the hard carbon film.

Figure 21:
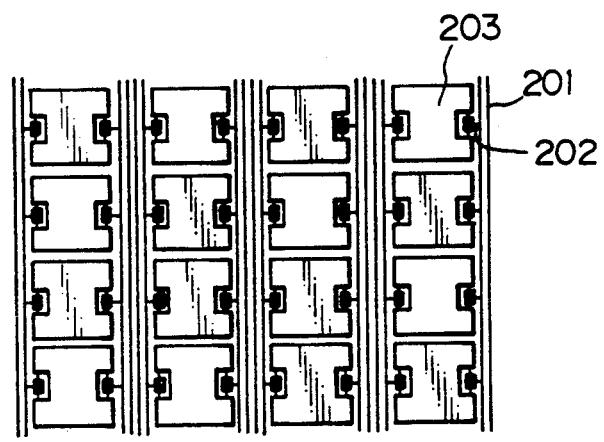
FIG. 21 is a constructional view of another example of the electrode arrangement of the liquid crystal display device in accordance with the present invention.

FIG. 21 illustrates another example of the electrode layout of the present invention. This example is different from that of FIG. 19 in that the MIM device is disposed in a recess of the pixel electrode so that the opening ratio of the structure is enlarged. The recess in which the MIM device is disposed is formed on each lateral side of the pixel. However, it is to be noted that the MIM devices may be connected to any portion of the pixel.

The MIM device in accordance with the present invention is further described with regard to the material thereof in detail below.

The insulator substrate 101 (FIGS. 17 and 18) is made from a glass plate, a plastic plate or a flexible plastic film.

The lower electrode 108 may be made from a conductive material such as Al, Ta, Cr, W, Mo, Pt, Ni or a transparent conductor. However, it is desirable to use Al from the standpoint of superior non-linear characteristic thereof.

Figure 22A:
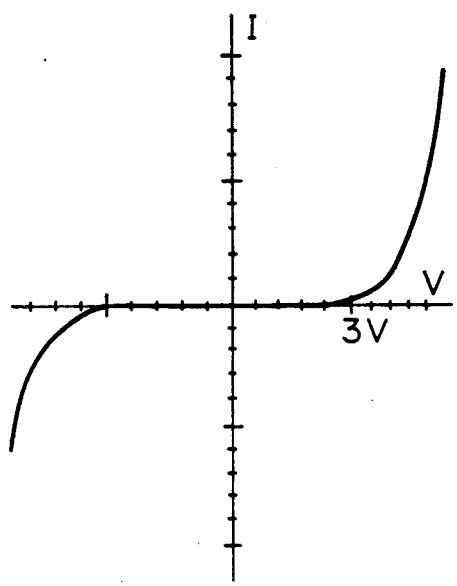
FIGS. 22a and 22b are graphical views of the I-V characteristic of an example of the MIM device.
Figure 22B:
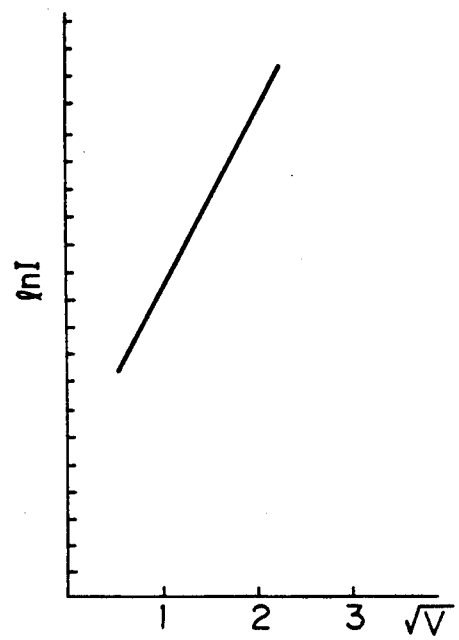

FIG. 22a is a graphical view of the I-V characteristic of the MIM device of the present invention using Al as the lower electrode. FIG. 22b is a graphical view of the lnI-$\sqrt{V}$ characteristic of the same MIM device as that of FIG. 22a. The upper electrode is made from Ni, Pt or Al.

Figure 23A:
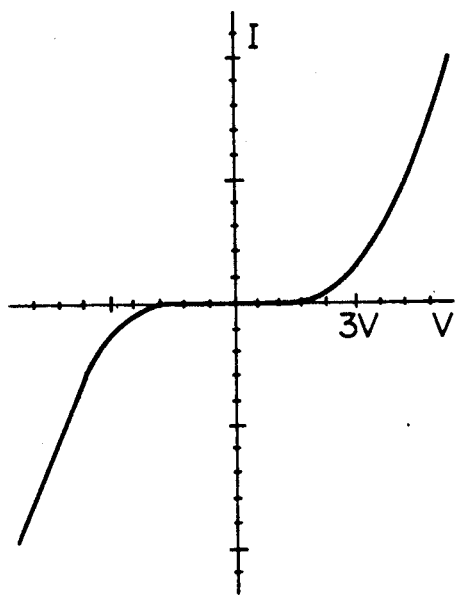
FIGS. 23a and 23b are graphical views of the I-V characteristic of another example of the MIM device.
Figure 23B:
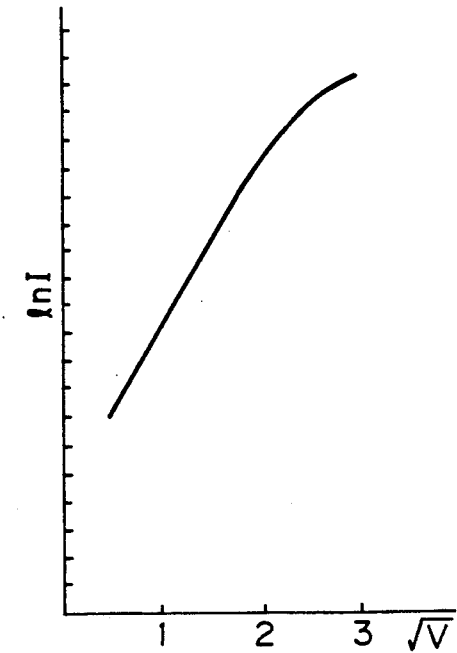

FIG. 23a is a graphical view of the I-V characteristic of the MIM device of the present invention using Cr, Mo or Ni as the lower electrode. FIG. 23b is a graphical view of the lnI-$\sqrt{V}$ characteristic of the same MIM device as that of FIG. 23a. The upper electrode is made from Ni, Pt or Al.

As can be seen from the graphs, by using Al as the lower electrode material, a good non-linear characteristic can be obtained, whereas when a material other than Al is used as the lower electrode, the linearity of the lnI-$\sqrt{V}$ characteristic is impaired in the high voltage side.

Therefore, it is desirable to use Al as the lower electrode material.

With respect to the material for the upper electrode, it may be possible to use various conductive materials such as Al, Cr, Ni, Mo, Pt, Ag, and the transparent conductors. However, it is desirable to use Ni, Pt or Ag from the standpoint of the superior stability and reliability with respect to the I-V characteristic thereof.

As mentioned before, the MIM device comprising the hard carbon insulator film has a structure of symmetric characteristic and conducts the electricity in accordance with the Pool-Frenkel type conduction as can be seen from the lnI-$\sqrt{V}$ relationship. Also, each of the materials for the upper and lower electrodes can be selected individually regardless of the other. However, according to the bonding strength and the boundary state between the hard carbon film and the electrode, the I-V characteristic of the device is changed or even impaired as described below.

Figure 24A:
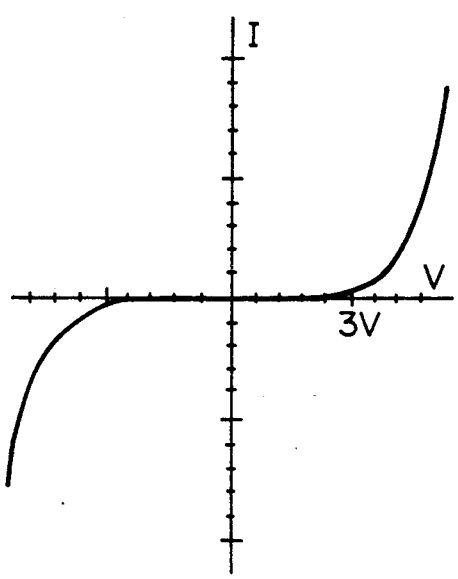
FIGS. 24a and 24b are graphical views of the I-V characteristic of still another example of the MIM device.
Figure 24B:
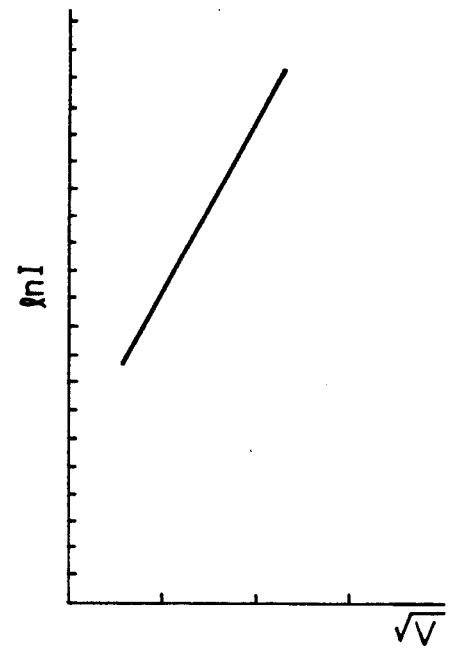

FIG. 24a is a graphical view of the I-V characteristic of the MIM device of the present invention using Ni, Pt, or Ag as the upper electrode. FIG. 24b is a graphical view of the lnI-$\sqrt{V}$ characteristic of the same MIM device as that of FIG. 24a. The lower electrode is made from Al.

Figure 25A:
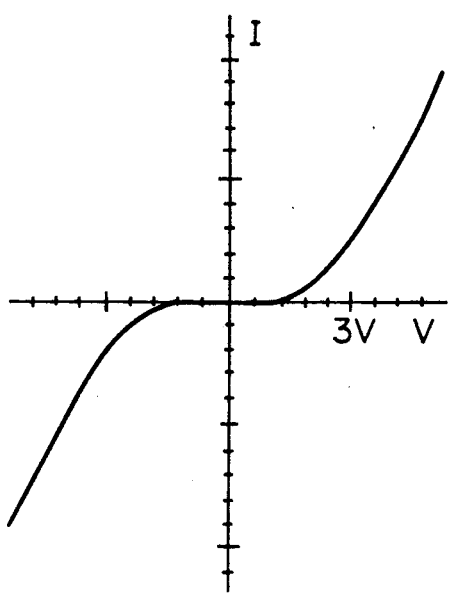
FIGS. 25a and 25b are graphical views of the I-V characteristic of still another example of the MIM device.
Figure 25B:
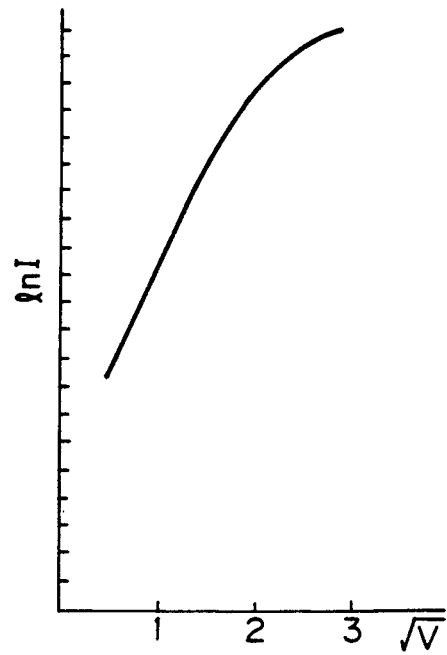

FIG. 25a is a graphical view of the I-V characteristic of the MIM device of the present invention using W, Mo or Cr as the upper electrode. FIG. 25b is a graphical view of the lnI-$\sqrt{V}$ characteristic of the same MIM device as that of FIG. 25a. The lower electrode is made from Al.

As can be seen from the graphs, in the low voltage side, the lnI-$\sqrt{V}$ characteristic shows a satisfactory linearity with regard to any electrode materials. Whereas, in the high voltage side, the linearity or the Cr and Mo electrodes are impaired so that the current is reduced.

Also, with regard to the bonding strength, Ni is the best followed by Pt, Ag, Mo, Cr, Al in this order.

With regard to the I-V characteristic degradation with the passage of time, there can be seen almost no degradation with respect to Ni, Pt and Ag, while Mo, Cr and Al in this order are degraded with the passage of time.

The material for each electrode should be selected considering the test result of the various characteristics mentioned above.

Further, results of temperature cycle test ($-20°$ C. to $+60°$ C., holding time 30 min., 10 cycles) are represented in the following tables 3 and 4. As can be seen from the tables, there is no change in outer view of the film such as separation from the substrate with respect to Ni, Pt, and Ag. Also, the I-V characteristic of Ni and Pt do not change so that the stability of the materials are superior to the other materials.

TABLE 3

| Temperature Cycle Test | | | |
|---|---|---|---|
| Upper electrode | Ni | Pt | Ag |
| Ion hold ratio Ion/$I_o$on (%) | 99.2 | 99.5 | 89.3 |
| Symmetry hold ratio R/$R_o$ (%) | 99.8 | 101.0 | 105.7 |

(Note)
Ion: Current value when Von applied.
R: Current ratio of +bias and −bias.
Ion hold ratio: Ratio of current relative to initial current $I_o$on when Von applied.
Symmetry hold ratio: Ratio of current ratio R relative to initial value $R_o$.

Figure 26:
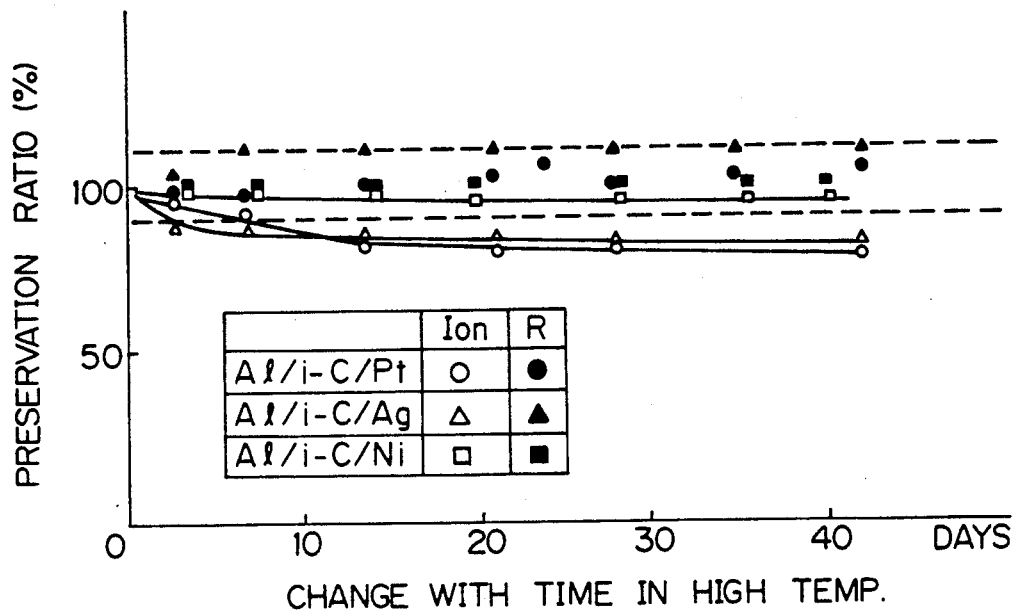
FIG. 26 is a graphical view of a preservation characteristic of the MIM device in a high temperature.
Figure 27:
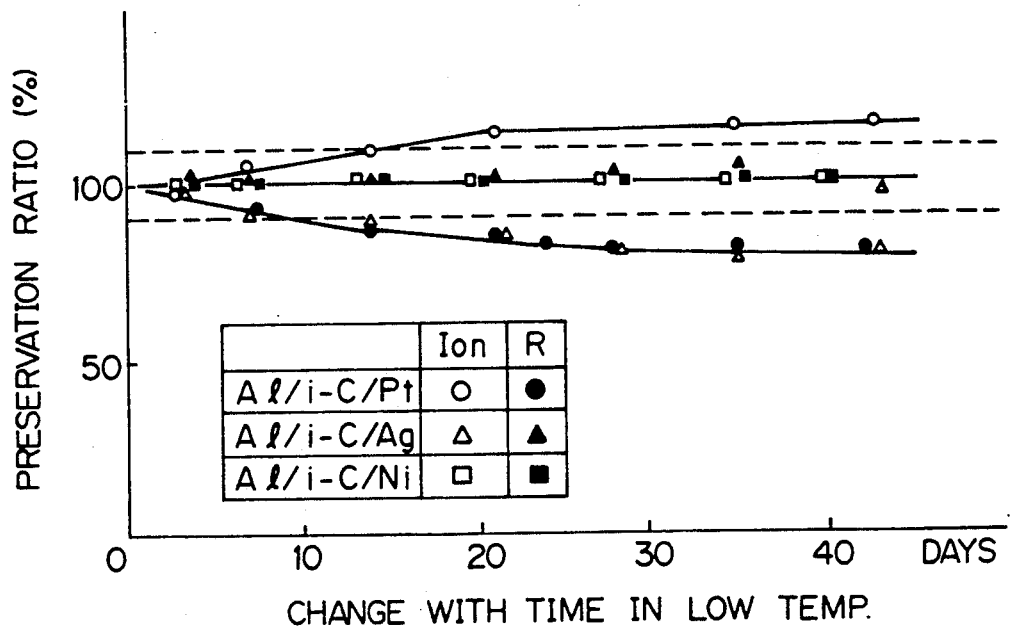
FIG. 27 is a graphical view of a preservation characteristic of the MIM device in a low temperature.

Also, results of a high temperature preservation test (80° C., dry time 1000 hr) and a low temperature preservation test ($-20°$ C., dry time 1000 hr) are represented in FIGS. 26 and 27 as well as in the following table 4.

TABLE 4

| | Preservation Test | | | | | |
|---|---|---|---|---|---|---|
| | Upper el. | | | | | |
| | Ni | | Pt | | Ag | |
| Temp. | high | low | high | low | high | low |
| I/$I_o$ (%) | 96.9 | 100.0 | 80.0 | 108.4 | 85.4 | 80.1 |
| R/$R_o$ (%) | 99.4 | 99.8 | 104.0 | 80.3 | 108.9 | 96.8 |

As can be seen from the table 4, a stable MIM is obtained from any of Ni, Pt and Ag. Especially, Ni is as a whole desirable to be used for the upper electrode.

Actually fabricated examples of the MIM device in accordance with the present invention are described hereinafter.

EXAMPLE 1

Figure 28:
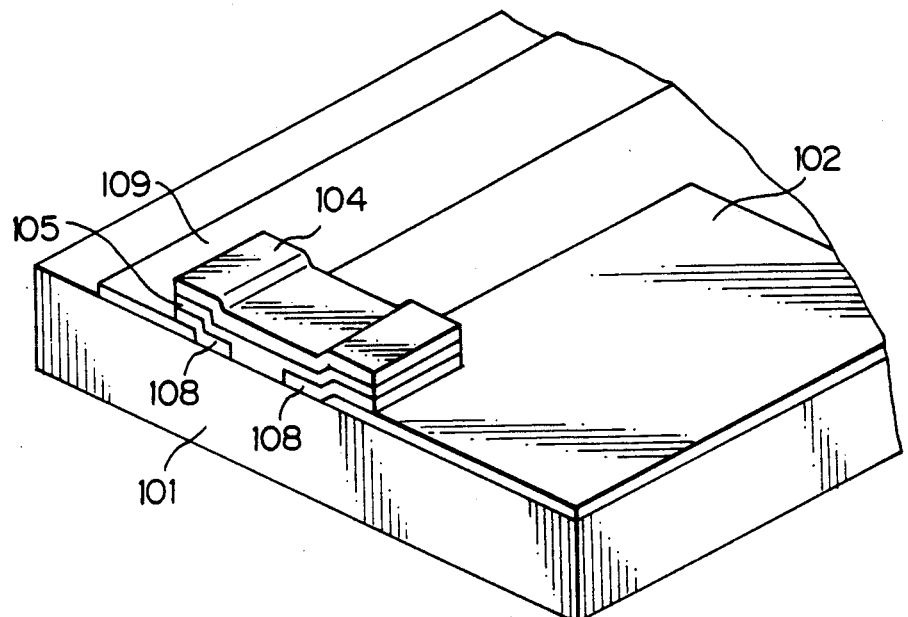
FIG. 28 is another perspective explanatory view of the MIM device structure.

This example of the MIM device has a structure essentially as illustrated in FIG. 28. One of the pair of transparent substrates of the LCD panel is constituted by a pyrex glass substrate 101 on which ITO is deposited by a sputtering method to a thickness of 1000 Å. The ITO is patterned to form a pixel electrode 102. After that, Al is deposited on the pixel electrode 102 and the substrate 101 to a thickness of 1000 Å by a vacuum deposition method. The Al is patterned to form a lower electrode 108 and a scanning electrode (common electrode) 109. The electrodes 102 and 109 are separated from each other so as not to be electrically connected together. A hard carbon film is deposited on the electrodes to a thickness of 900 Å by a plasma CVD method. The film is patterned by a dry etching method to form a hard carbon insulator film 105. The conditions for depositing the hard carbon film are as follows.

Pressure: 0.035 Torr
Flow rate of CH$_4$: 20 SCCM

RF power: 0.2 W/cm$^2$

Temperature: Room temp.

After that, Ni is deposited on the insulator film 105 to a thickness of 1000 Å by a vacuum deposition method. The Ni is patterned to form a upper electrode 104. By the manner mentioned above, one of the pair of transparent substrates is fabricated.

Figure 29:
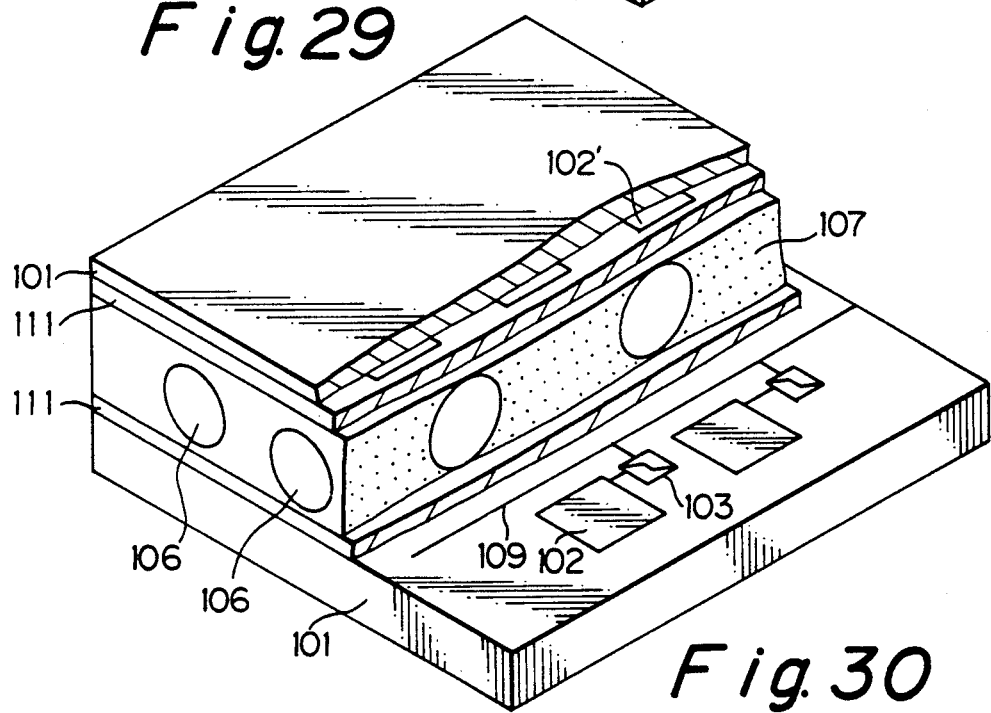
FIG. 29 is a partial sectional perspective explanatory view of the liquid crystal display device having the MIM device.

On the other hand, the other of the pair of transparent substrates is prepared as follows. The pair of substrates 101 are coupled together facing to each other as illustrated in FIG. 29. This other substrate (counter substrate) comprises a pyrex glass substrate 101 on which ITO is deposited to a thickness of 1000 Å by a sputtering method. The ITO is patterned to form a predetermined stripe shaped pattern of common electrodes 102'.

After that, a polyimide film is formed on each of the pair of substrates as an orientation film 111 which is applied with a rubbing treatment.

After that, the two substrates 101 are opposed to each other with the common electrodes 102 and 102' thereof being disposed inside and laminated together with gap members 106 of 5 μm diameter being interposed therebetween to form a cell between the substrates. Finally, a liquid crystal material 107 is charged and sealed in the above mentioned cell to form an LCD device.

EXAMPLE 2

Figure 30:
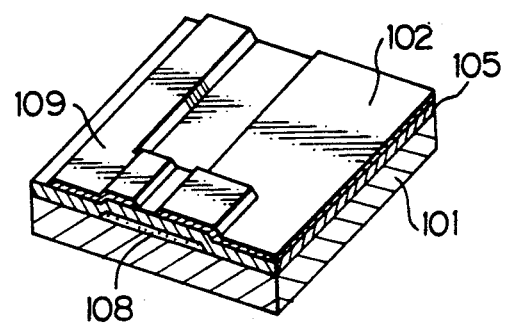
FIG. 30 is a perspective explanatory view of the MIM device structure.

As illustrated in FIG. 30, Al is deposited on a glass substrate 101 to a thickness of 1000 Å by a vacuum deposition method. The Al is etched to form a pattern of lower electrode 108. After that, a hard carbon film 105 is deposited to a thickness of 750 Å on the electrode 108. Then, ITO is deposited to a thickness of 1000 Å on the film 105 by an electron beam deposition method. The ITO is patterned to form a pixel electrode 102 and a scanning electrode 109. The electrodes 102 and 109 are separated from each other. By the process mentioned above, two MIMs connected in series are fabricated on the substrate.

The conditions for forming the hard carbon film of this MIM are as follows.

Pressure: 0.05 Torr

Flow rate of CH$_4$: 10 SCCM

RF power: 0.1 W/cm$^2$

Temperature: 100° C.

On the other hand, a counter substrate 101 which is to be coupled to the substrate 101 mentioned above is prepared as follows. The counter substrate 101 comprises a plastic film on which an ITO film is deposited to a thickness of 500 Å by a sputtering method. The ITO film is patterned to form a predetermined stripe shaped pattern of common eleerodes. After that, a polyimide film 111 is formed on the common electrodes and applied with a rubbing treatment as in the case of example 1, mentioned above. The two substrates are laminated together with the gap members 106 being interposed therebetween in the same manner as example 1 to form a cell. After that, a liquid crystal material 107 is charged and sealed in the cell to form an LCD device.

EXAMPLE 3

Figure 31:
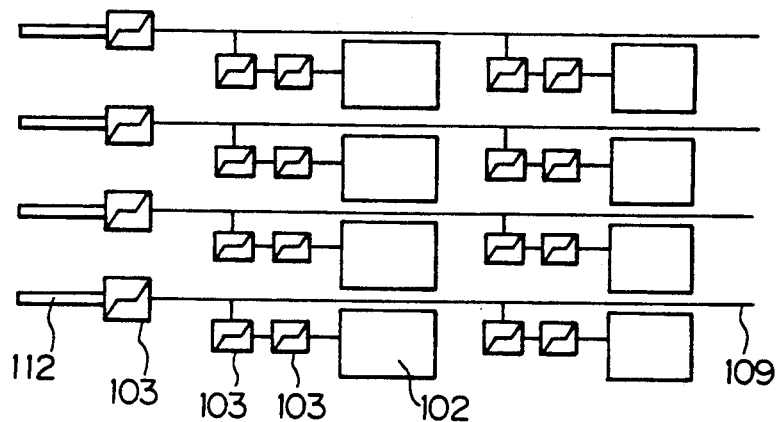
FIG. 31 is an explanatory view of a substrate arranged in such a way that a plurality of MIM elements are connected to one pixel.

The transparent substrate is made from a pyrex glass substrate. The pixel electrode is made from ITO. The lower electrode is made from NiCr. The thickness of the hard carbon film is 600 Å. The upper electrode is made from Ag. The structure of the substrate is substantially the same as the example 1. Further, as illustrated in FIG. 31 of this particular example, another MIM device 103 is formed in the vicinity of each lead terminal portion 112 in addition to the MIM devices 103 connected to the pixel electrode 102 in the same process. Accordingly, three MIM devices 103 are connected in series to each pixel 102.

On the other hand, a counter substrate is fabricated in such a way that an ITO film is deposited on a pyrex glass substrate to a thickness of 800 Å by a magnetron sputtering method. The ITO film is patterned to form a stripe shaped pattern of common electrodes. After that, a polyimide film is formed on the common electrodes and applied with a rubbing treatment as in the case of example 1, mentioned above. The two substrates are laminated together with the gap members being interposed therebetween in the same manner as example 1 to form a cell. After that, a liquid crystal material is charged and sealed in the cell to form an LCD device.

To cope with this point, another feature of the present invention resides in that each pixel electrode is connected to two scanning electrode lines through the MIM devices so as to avoid the defects of display. More precisely, with regard to the wire snapping, by the arrangement of two electrode lines for one pixel electrode, if one of the lines is snapped, it becomes possible to apply an electric charge to the liquid crystal layer through the remaining normal line. Also, with regard to the problem due to the short circuit of the device, it becomes possible to repair the defect of display by removing the short circuited MIM device of the two MIM devices constituting the defect pixel by an appropriate method such as irradiating a laser beam so as to drive the pixel by the remaining normal MIM.

FIG. 19 illustrates a layout of electrodes formed on one of the substrates (not shown) constituting the LCD. In the drawing, numeral 201 designates a scanning electrode, numeral 202 designates an MIM device and numeral 203 designates a pixel electrode, respectively.

FIG. 20a illustrates an equivalent circuit diagram of one pixel of the liquid crystal display device comprising the electrode layout of FIG. 19 representing a normal state wherein the two MIM devices and the two scanning lines connected to the pixel are normally functioning.

On the other hand, FIG. 20b illustrates an equivalent circuit diagram of the pixel of FIG. 20a in a state wherein one of the MIM devices is short circuited and removed by irradiating a laser beam. In FIGS. 20a and 20b, numeral 204 designates a resistance of the liquid crystal, numeral 205 designates a capacitor of the liquid crystal, numerals 206 and 208 designate a resistance of the MIM device, numerals 207 and 209 designate a capacitor of the MIM device and numeral 210 designates a drive means.

When a drive voltage Von is applied to the circuit from the drive means 210, the voltage V which is applied to the MIM device is represented by $$V = \frac{C_{LCD}}{C_{LCD} + C_{MIM}} V_{on}$$

wherein $C_{LCD}$ designates the capacitance of the liquid crystal and $C_{MIM}$ designates the capacitance of the combined MIM devices.

It is to be noted that, in the state of FIG. 20a, the surface area of MIM devices is twice as large as that in the state of FIG. 20b. However, the voltage V of FIG. 20a is low compared to the state of FIG. 20b for a same driving voltage Von since the capacitance of the MIM of FIG. 20a is twice as large as that of FIG. 20b. Therefore, the total current which passes through the MIM devices of FIG. 20a does not differ very much from the current which passes through the MIM device of FIG. 20b.

Also, as mentioned before, to supply the MIM device with sufficient voltage, it is necessary that $C_{MIM} << C_{LCD}$. Therefore, the ratio of the capacitances is set as $C_{MIM}$: $C_{LCD}$=1:10, as mentioned before. The capacitance is proportional to the area of the device. Therefore, when two MIM devices are connected in parallel to the pixel, it becomes necessary to reduce the area of each MIM device to half of the area of MIM device in the arrangement of only one MIM device is used. However, as mentioned before, the specific dielectric constant of the hard carbon film is relatively low, that is, 3 to 5, so that it is unnecessary to reduce the size of the MIM device, which is also one of advantageous points of the MIM device using the hard carbon film.

FIG. 21 illustrates another example of the electrode layout of the present invention. This example is different from that of FIG. 19 in that the MIM device is disposed in a recess of the pixel electrode so that the opening ratio of the structure is enlarged. The recess in which the MIM device is disposed is formed on each lateral side of the pixel. However, it is to be noted that the MIM devices may be connected to any portion of the pixel.

EXAMPLE 4

One of a pair of transparent substrates to be coupled together is made from a pyrex glass substrate on which ITO is deposited to a thickness of about 1000 Å by a sputtering method. The ITO film is patterned to form a pixel electrode. After that, MIM device as an active element means of the LCD are formed as follows. First, Al is deposited on the pixel electrode formed on the substrate to a thickness of about 1000 Å by a vacuum method. The Al film is patterned to form a lower electrode. On the lower electrode, a hard carbon film is deposited to a thickness of about 800 Å by a plasma CVD method. The hard carbon film is patterned to form an insulator layer by a dry etching method. Conditions for forming the hard carbon film are as follows.

Pressure: 0.035 Torr
Flow rate of CH$_4$: 15 SCCM
RF power: 0.2 W/cm$^2$

After that, Ni is deposited on each of the patterned hard carbon films to a thickness of about 100 Å by a vacuum method. The Ni film is patterned to form an upper electrode.

On the other hand, the other of the pair of transparent substrates (counter substrate) is made from a pyrex substrate on which ITO is deposited to a thickness of about 1000 Å by a sputtering method. The ITO film is patterned to form a stripe shaped pattern of common pixel electrodes.

After that, a polyimide film is coated on each of the substrates and applied with a rubbing treatment to form an orientation film.

Figure 32:
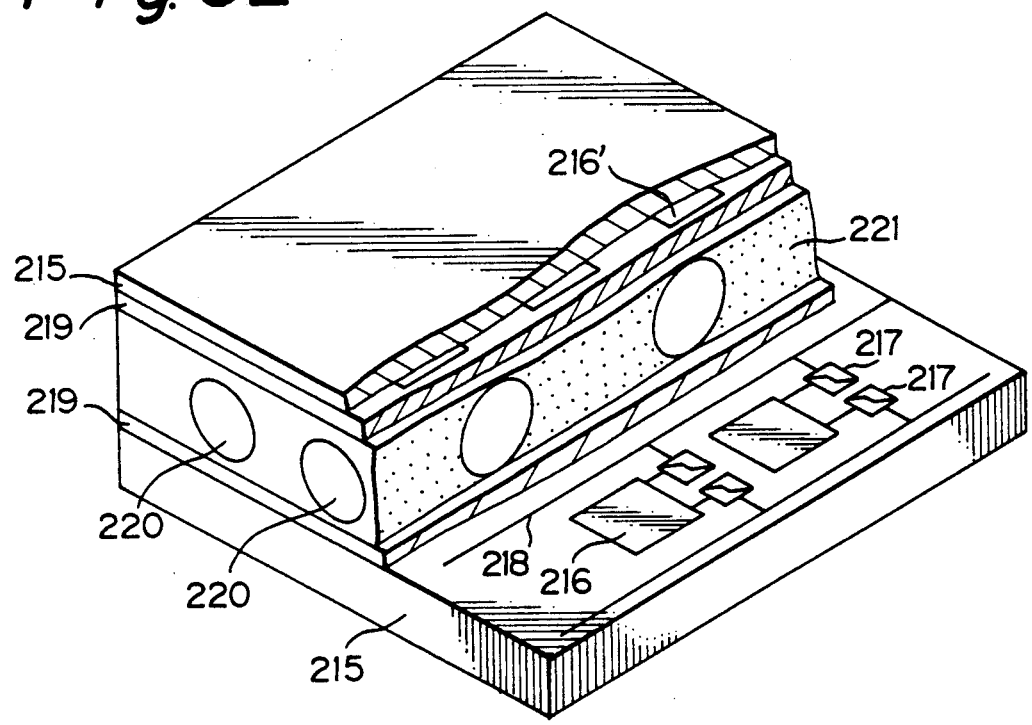
FIG. 32 is a partial cutout perspective view of the liquid crystal matrix display device in accordance with the present invention.

After that, the two substrates are disposed to face to each other with the pixel electrodes thereof being inside and laminated together through gap members of about 5 μ diameter interposed therebetween to form a cell. Then a liquid crystal material is changed and sealed in the cell to form liquid crystal display device as illustrated in FIG. 32. The liquid crystal display device illustrated in FIG. 32 comprises a transparent substrate 215, pixel electrodes 216, common pixel electrodes 216', MIM devices 217, a common electrode (scanning electrode) or common line 218, an orientation film 219, a gap member 220, and a liquid crystal material 221.

EXAMPLE 5

Figure 33:
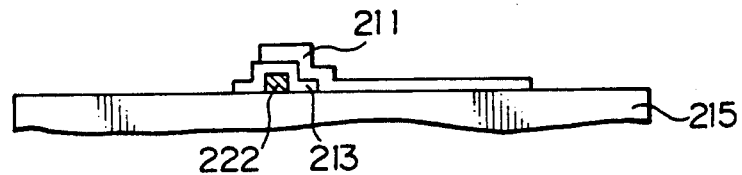
FIG. 33 is a sectional view of the MIM device in accordance with the present invention.

An Al thin film of about 1000 Å is formed on a glass substrate by an evaporation method. The Al film is etched to form a pattern of a lower electrode. After that, a hard carbon film of about 1100 Å is coated on the lower electrode. The hard carbon film is patterned by a dry etching method to form an insulator film. Then, on each of the patterned hard carbon insulator films, an ITO film is formed to a thickness of about 1000 Å by a vacuum deposition method. The ITO film is etched to form a pattern of upper transparent pixel electrode. By the above mentioned process, an MIM device as illustrated in FIG. 33 is fabricated. In FIG. 33, numeral 215 designates an transparent substrate, numeral 222 designates a metallic electrode, numeral 211 designates a transparent electrode, and numeral 213 designates a hard carbon insulator film. The hard carbon film is deposited under the condition described below.

Pressure: 0.05 Torr
Flow rate of CH$_4$: 10 SCCM
RF power: 0.1 W/cm$^2$

On the other hand, a counter substrate is made from a plastic film on which ITO is deposited to a thickness of about 500 Å by a sputtering method. The ITO film is patterned to form a stripe shaped pattern of common pixel electrodes. After that, as in the case of example 1 mentioned above, a polyimide film is coated on each of the substrates and applied with a rubbing treatment to form an orientation film.

The two substrates are laminated together by the same way as example 1 through gap members. After that, a liquid crystal material is charged and sealed in the cell formed between the substrates. By the process mentioned above, a liquid crystal display device is fabricated.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal display device, comprising:
   a pair of transparent substrates arranged to face each other;
   a liquid crystal layer sandwiched between said transparent substrates;
   a plurality of common electrodes each having a strip configuration formed on an inside face of one of said configuration formed on an inside face of one of said transparent substrates;
   a plurality of pixel electrodes formed on an inside face of the other of said transparent substrates in a matrix having columns and rows such that each row of said pixel electrodes is arranged along a respective one of said common electrodes for defining a respective row of pixels in association with said common electrodes, each of said pixel electrodes being divided into at least two interdigitating comb-shaped parts;

a plurality of MIM switching devices formed on said inside face of the other of said transparent substrates and respectively connected to each of said parts of said pixel electrodes, each of said MIM switching devices including a first metal film, a hard carbon film on said first metal film and a second metal film on said hard carbon film; and a plurality of extending scanning electrodes disposed on said inside face of said other of said transparent substrates along respective columns of said pixel electrodes, and each of said scanning electrodes being coupled to one column of said pixel electrodes along said each of said scanning electrodes through said respective MIM switching devices.

2. A liquid crystal display device according to claim 1, wherein said first metal film of each of said MIM switching devices is connected to one of said scanning electrodes.

3. A liquid crystal display device according to claim 1, wherein said second metal film of each of said MIM switching devices is connected to a respective one of said parts of said pixel electrodes.

4. A liquid crystal display device according to claim 1, wherein said hard carbon film contains at least one elements selected from the group consisting of a group III element, a group IV element other than C and a group V element of the periodical table, an alkaline metal element, an alkaline earth metal element, a nitrogen atom, an oxygen atom, a chalcogen element and a halogen atom.

5. A liquid crystal display device according to claim 1, wherein a thickness of said hard carbon film is within a range of a 100 to 8000 Å.

6. A liquid crystal display device according to claim 1, wherein a thickness of said hard carbon film is within a range of 200 to 6000 Å.

7. A liquid crystal display device according to claim 1, wherein a thickness of said hard carbon film is within a range of 300 to 4000 Å.

8. A liquid crystal display device according to claim 1, wherein a thickness of said hard carbon film is within a range of 1100 to 3100 Å.

9. A liquid crystal display device according to claim 1, wherein said first metal film is composed of Al.

10. A liquid crystal display device according to claim 9, wherein said second metal film is selected from a group consisting of Ni, Pt and Ag.

11. A liquid crystal display device, comprising:

a pair of transparent substrates arranged to face each other;

a liquid crystal layer sandwiched between said tranparent substrates;

a plurailty of common electrodes having a strip configuration formed on an inside face of one of said transparent substrates;

a pluraility of pixel electrodes formed on an inside face of the other of said transparent substrates in a matrix having columns and rows such that each row of said pixel electrodes is arranged along a respective one of said common electrodes for defining a respective row of pixels in association with said common electrodes, each of said pixel electrodes being obliquely divided into at least two parts;

a plurality of MIM switching device formed on said inside face of the other of said transparent substrates and respectively connected to each of said parts of said pixel electrodes, each of said MIM switching devices including a first metal film, a hard carbon film on said first metal film and a second metal film on said hard carbon film; and a plurality of extending scanning electrodes disposed on said inside face of said other of said transparent substrates along respective columns of said pixel electrodes, and each of said scanning electrodes being coupled to one column of said pixel elecrodes along said each of said scanning electrodes through said respective MIM switching devices.

* * * * *